US012574460B2

(12) United States Patent
Dhawan et al.

(10) Patent No.: US 12,574,460 B2
(45) Date of Patent: Mar. 10, 2026

(54) SYSTEM AND METHOD FOR MEASURING AGENT-BURNOUT INDEX AND IDENTIFYING A ROOT-CAUSE IN A CONTACT CENTER

(71) Applicant: NICE LTD., Ra'anana (IL)

(72) Inventors: Salil Dhawan, Maharashtra (IN);
Makarand Pundlik, Maharashtra (IN);
Darshan Ambhaikar, Maharashtra (IN)

(73) Assignee: NICE, LTD, Ra'anana (IL)

( * ) Notice: Subject to any disclaimer, the term of this patent is extended or adjusted under 35 U.S.C. 154(b) by 146 days.

(21) Appl. No.: 18/764,187

(22) Filed: Jul. 4, 2024

(65) Prior Publication Data

US 2026/0012537 A1      Jan. 8, 2026

(51) Int. Cl.
| | |
|---|---|
| *H04M 3/00* | (2024.01) |
| *G06F 40/205* | (2020.01) |
| *G06N 20/20* | (2019.01) |
| *G06Q 10/0631* | (2023.01) |
| *H04M 3/51* | (2006.01) |

(52) U.S. Cl.
CPC ........ *H04M 3/5175* (2013.01); *G06F 40/205* (2020.01); *G06N 20/20* (2019.01); *G06Q 10/063114* (2013.01); *H04M 2203/401* (2013.01); *H04M 2203/402* (2013.01); *H04M 2203/558* (2013.01)

(58) Field of Classification Search
CPC ......... H04M 3/5175; H04M 2203/401; H04M 2203/402; G06N 20/20; G06F 40/205; G06Q 10/063114

USPC ....... 379/265.01–265.14, 266.01–266.1, 309
See application file for complete search history.

(56) References Cited

U.S. PATENT DOCUMENTS

| | | | | |
|---|---|---|---|---|
| 8,200,527 | B1 * | 6/2012 | Thompson ............. | G06Q 30/00 705/7.41 |
| 8,386,639 | B1 * | 2/2013 | Galvin ................... | G06Q 10/06 705/7.14 |
| 11,736,615 | B2 * | 8/2023 | Stepanov ............ | H04M 3/5233 379/266.01 |
| 2004/0138944 | A1 * | 7/2004 | Whitacre ......... | G06Q 10/06398 705/7.42 |
| 2016/0180277 | A1 * | 6/2016 | Skiba .................. | H04M 3/5175 379/265.06 |
| 2018/0034966 | A1 * | 2/2018 | te Booij ............. | H04M 3/5232 |
| 2019/0158671 | A1 * | 5/2019 | Feast ...................... | G06Q 10/10 |
| 2022/0067630 | A1 * | 3/2022 | Asokan .................. | G06N 20/00 |

(Continued)

*Primary Examiner* — William J Deane, Jr.

(74) *Attorney, Agent, or Firm* — SOROKER AGMON NORDMAN RIBA

(57) ABSTRACT

A computerized-method for calculating an agent-burnout index and identifying root-cause factors. The computerized-method includes: (i) for each agent in an agents-database: a. calculating the agent-burnout index by operating a burnout-detection module and storing the agent-burnout index in the agents-database. The agent-burnout index indicates a level of stress and exhaustion of the agent; b. identifying root-cause factors of the calculated agent-burnout index by operating root-cause analyzer module and storing the identified root-cause factors in the agents-database; and (ii) automatically sending a push-notification to a user with details of agent-burnout index for each agent in the agents-database. The push-notification is displayed via a UI associated to a WFM application that is running on a computerized-device of the user.

15 Claims, 25 Drawing Sheets

200

210 for each agent in an agents-database: a. calculating the agent-burnout index by operating a burnout-detection module and storing the agent-burnout index in the agents-database. The agent-burnout index indicates a level of stress and exhaustion of the agent; and b. identifying root-cause factors of the calculated agent-burnout index by operating root-cause analyzer module and storing the identified root-cause factors in the agents-database;

220 automatically sending a push-notification to a user with details of agent-burnout index for each agent in the agents-database. The push-notification is displayed via a User Interface (UI) associated to a Workforce Management (WFM) application that is running on a computerized-device of the user.

(56)         References Cited

U.S. PATENT DOCUMENTS

| | | | |
|---|---|---|---|
| 2024/0031217 A1* | 1/2024 | Pahud | G06N 3/084 |
| 2024/0211830 A1* | 6/2024 | Mcreynolds | G06Q 10/103 |
| 2024/0211850 A1* | 6/2024 | Lang | G06Q 10/0833 |
| 2025/0247471 A1* | 7/2025 | Mahajan | G06V 40/20 |
| 2026/0006130 A1* | 1/2026 | Katti | H04M 3/5232 |

* cited by examiner

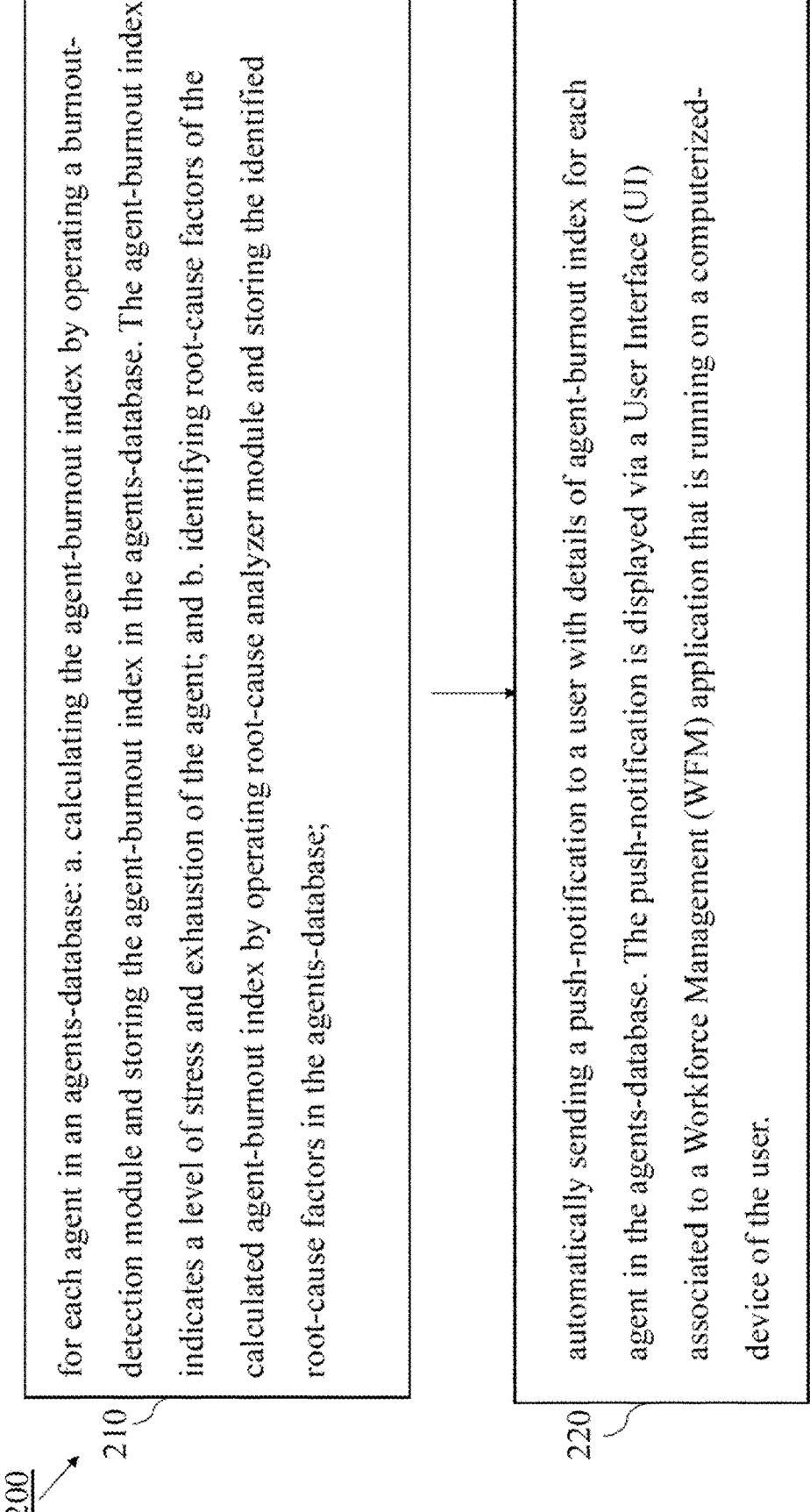

200

210 for each agent in an agents-database: a. calculating the agent-burnout index by operating a burnout-detection module and storing the agent-burnout index in the agents-database. The agent-burnout index indicates a level of stress and exhaustion of the agent; and b. identifying root-cause factors of the calculated agent-burnout index by operating root-cause analyzer module and storing the identified root-cause factors in the agents-database;

220 automatically sending a push-notification to a user with details of agent-burnout index for each agent in the agents-database. The push-notification is displayed via a User Interface (UI) associated to a Workforce Management (WFM) application that is running on a computerized-device of the user.

Figure 2

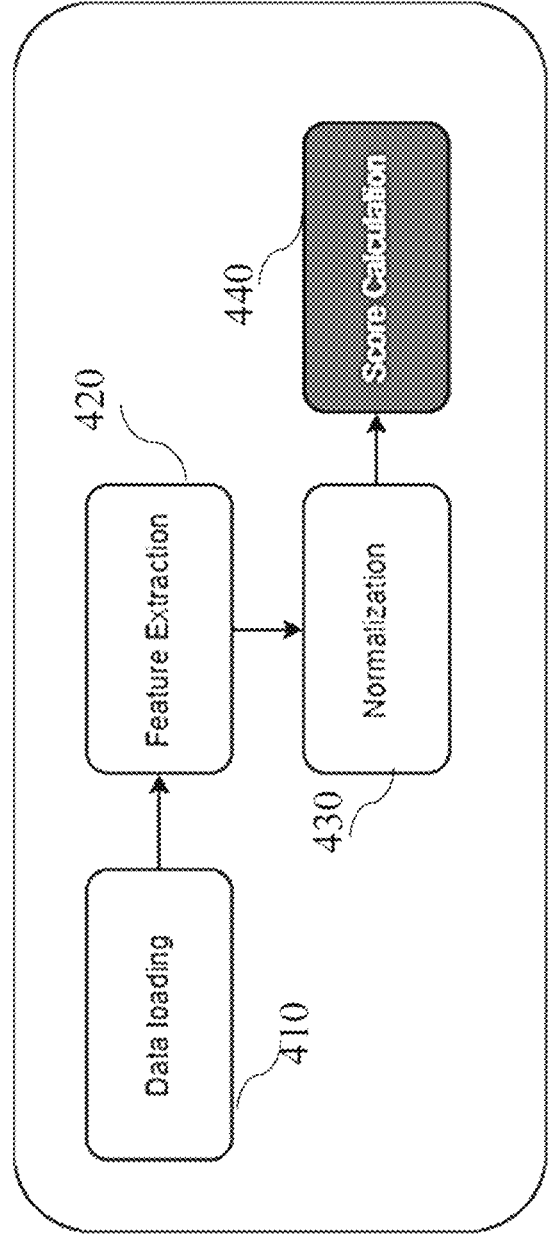
Figure 4

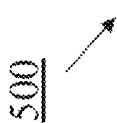
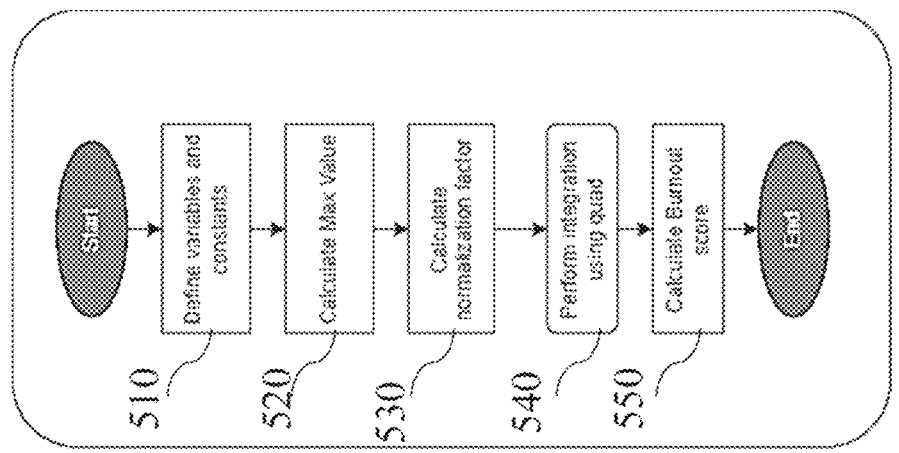
510 Define variables and constants
520 Calculate Max Value
530 Calculate normalization factor
540 Perform integration using quad
550 Calculate Burnout score
Figure 5

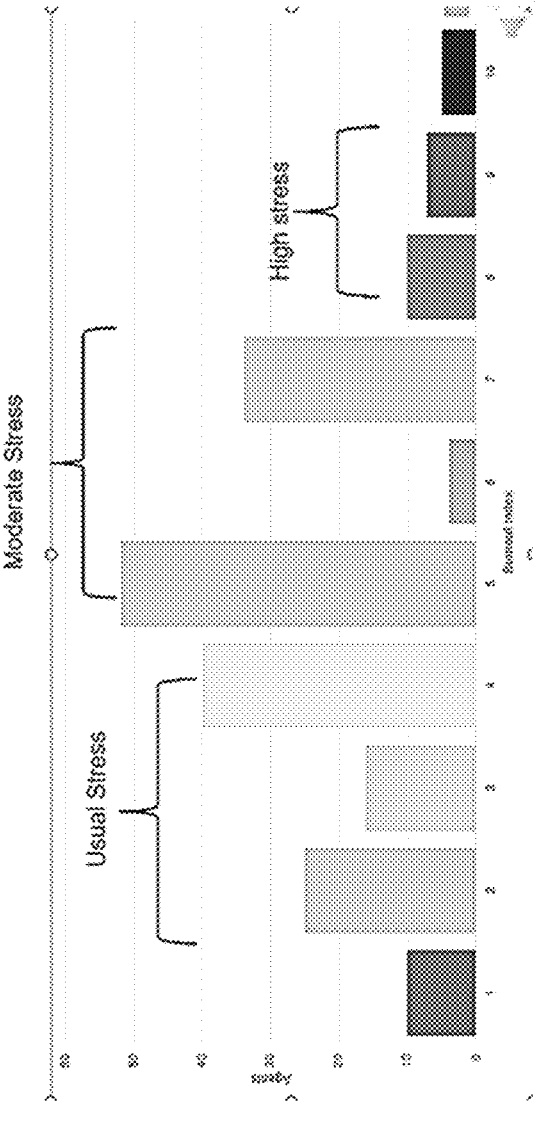
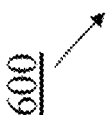
Figure 6

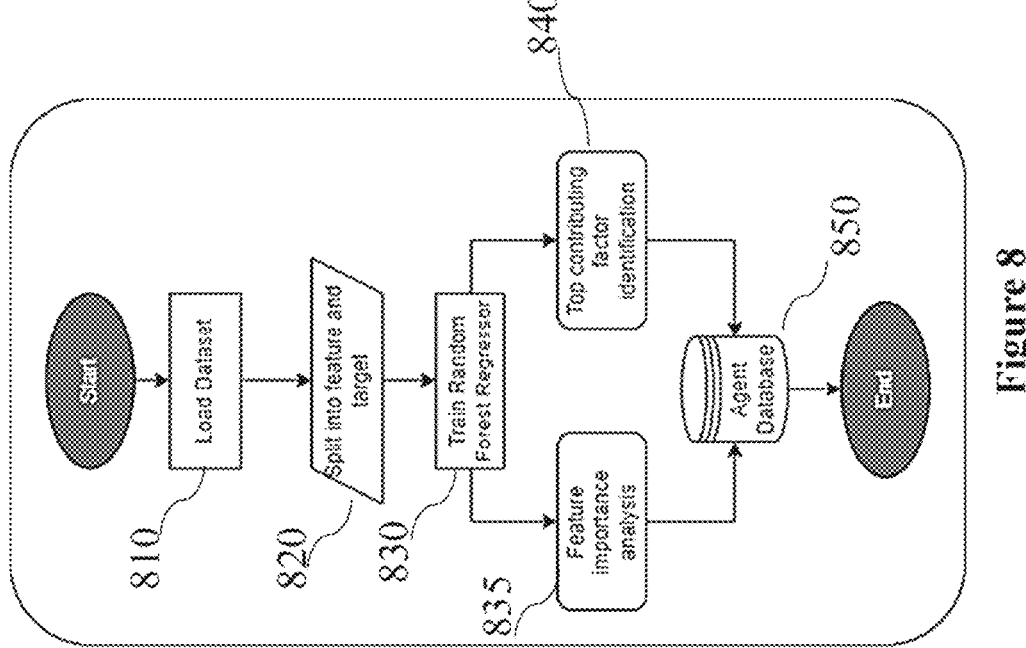
Figure 8

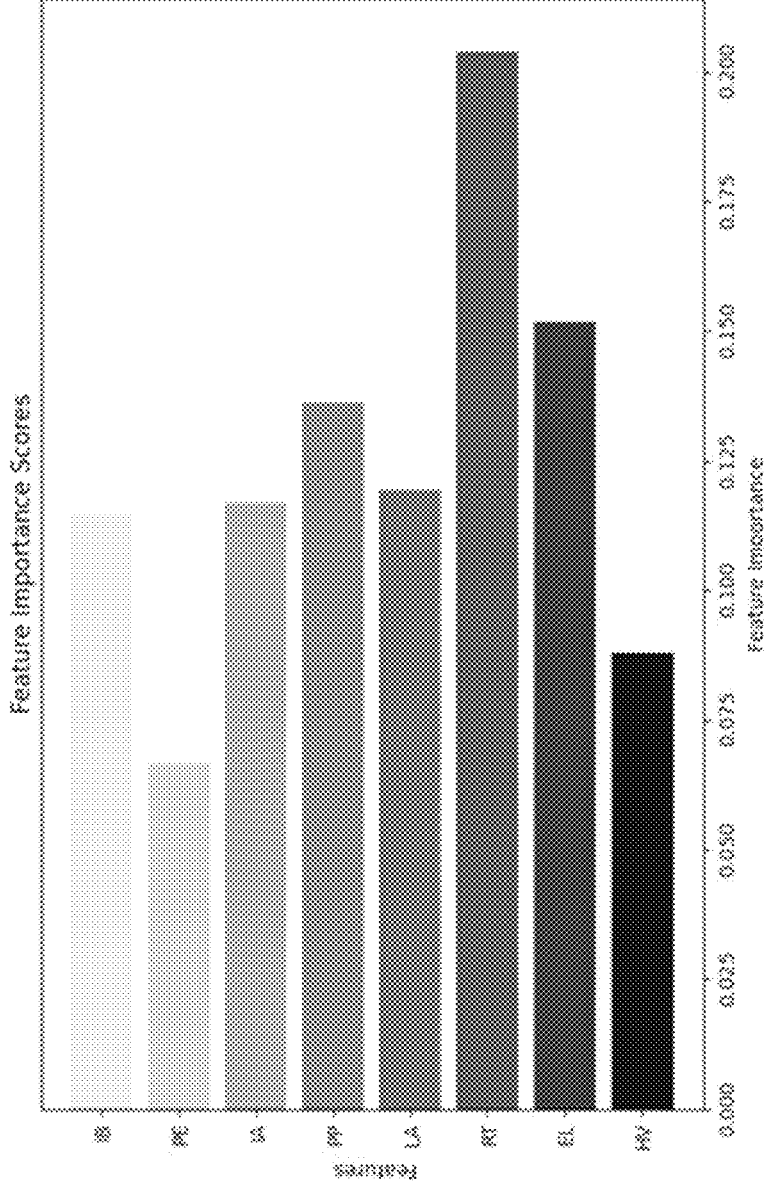
Figure 9

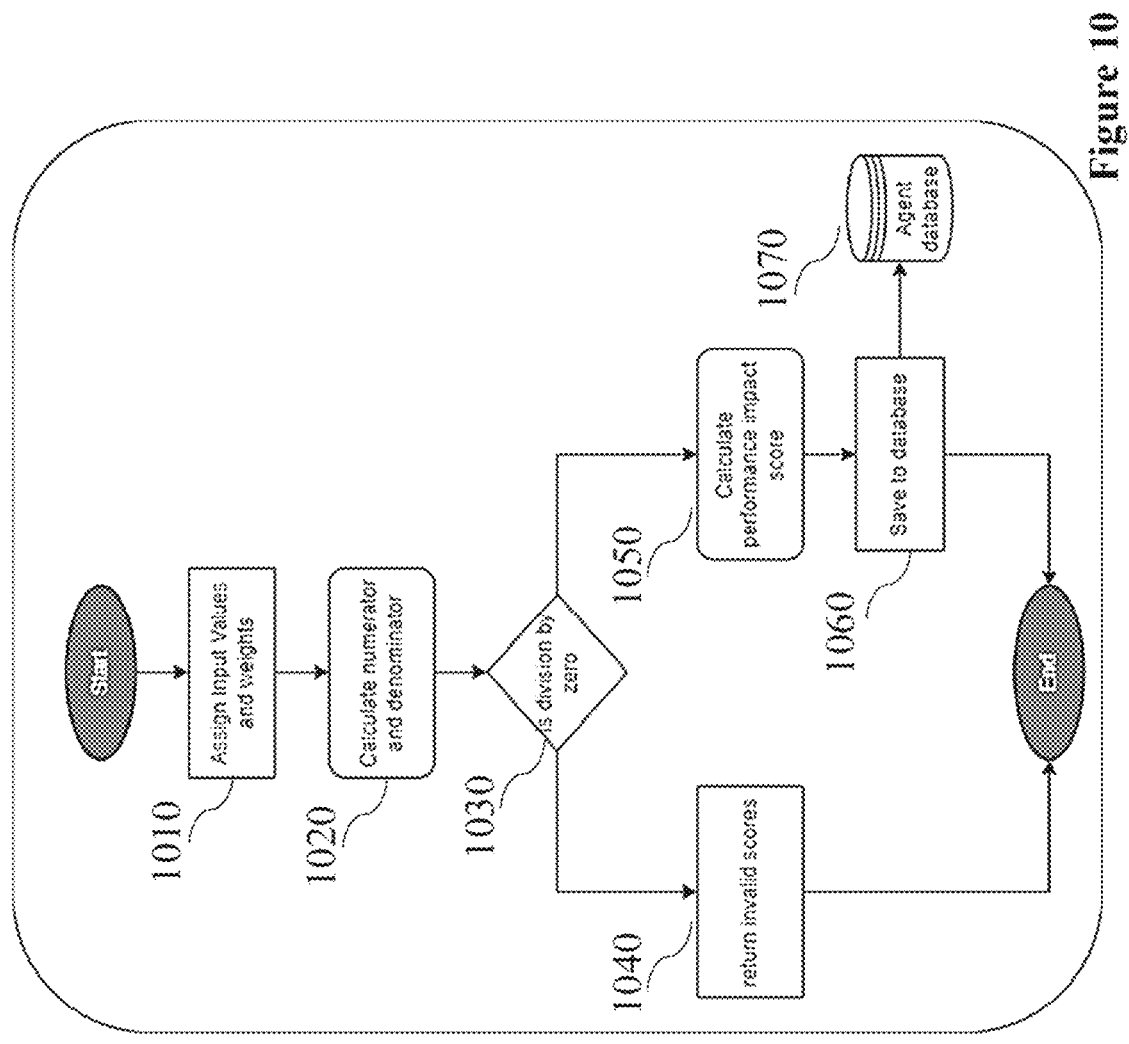
Figure 10

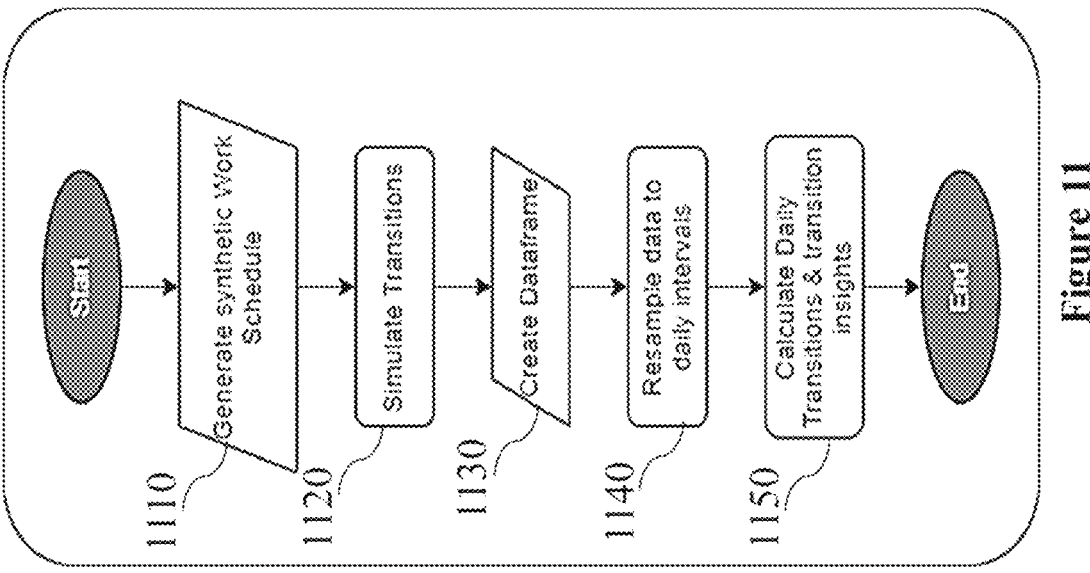
1110 Generate synthetic Work Schedule
1120 Simulate Transitions
1130 Create Dataframe
1140 Resample data to daily intervals
1150 Calculate Daily Transitions & transition insights
Figure 11
1100

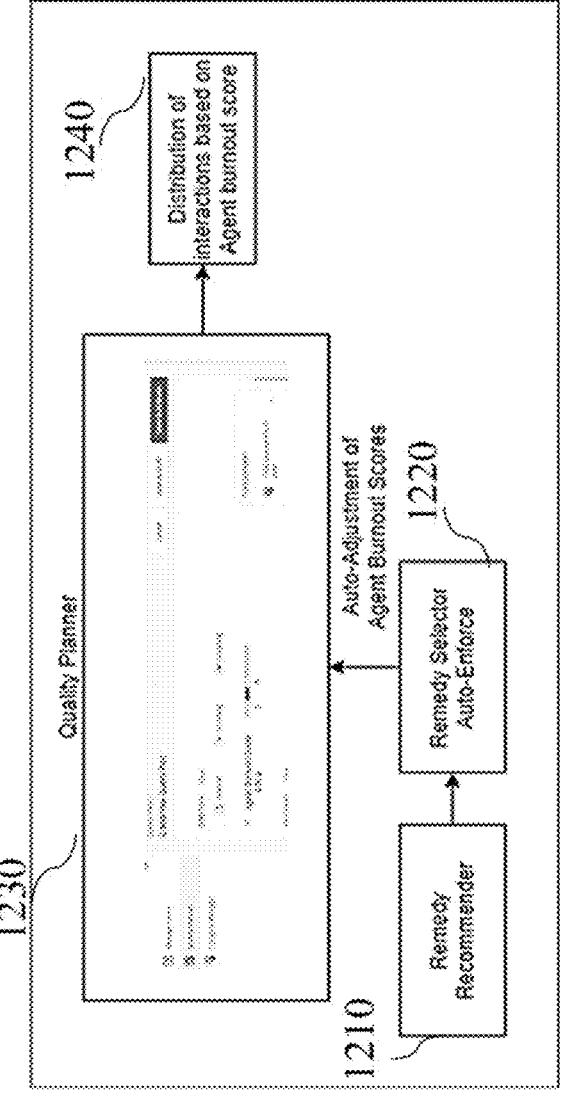
Figure 12

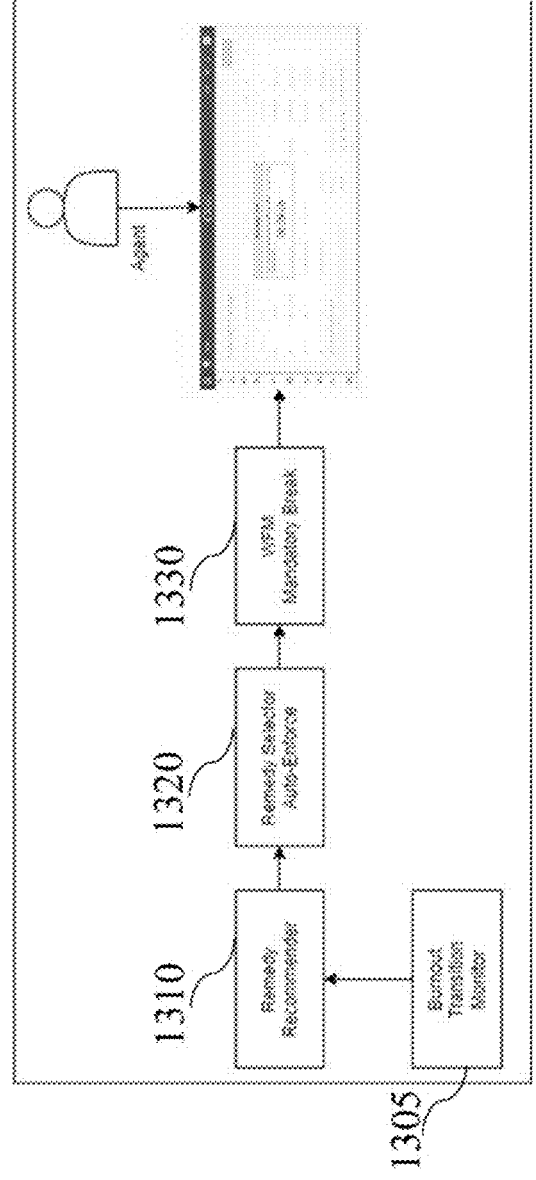
Figure 13

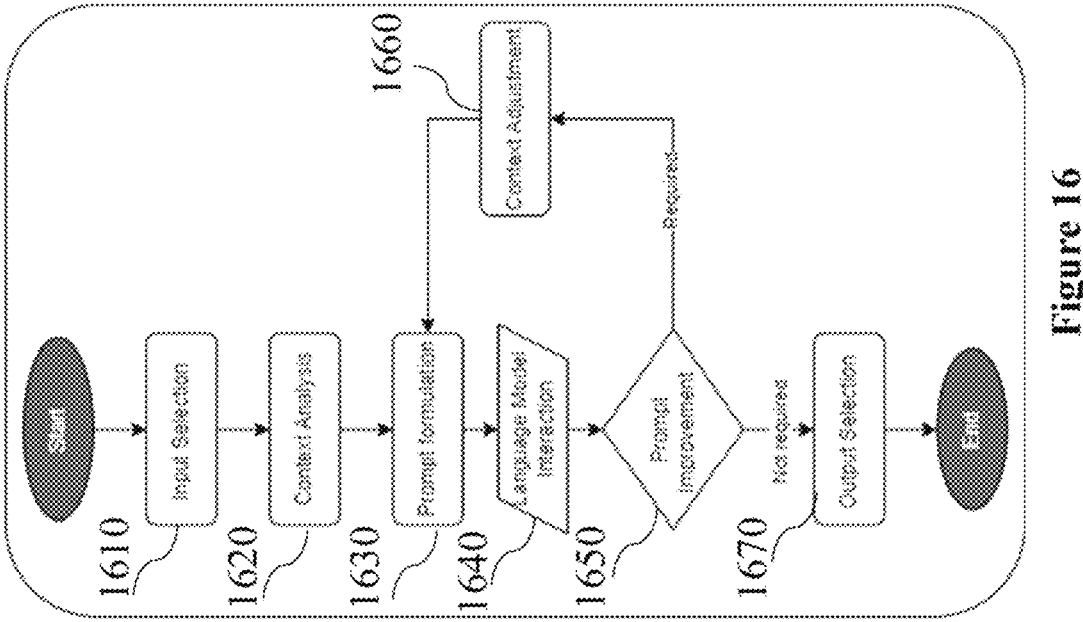
Figure 16

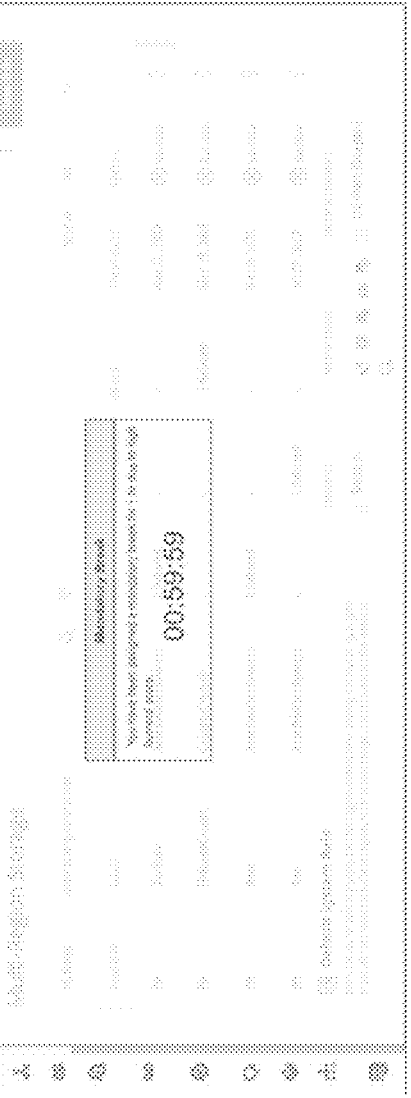
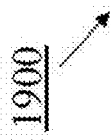
Figure 19

2000

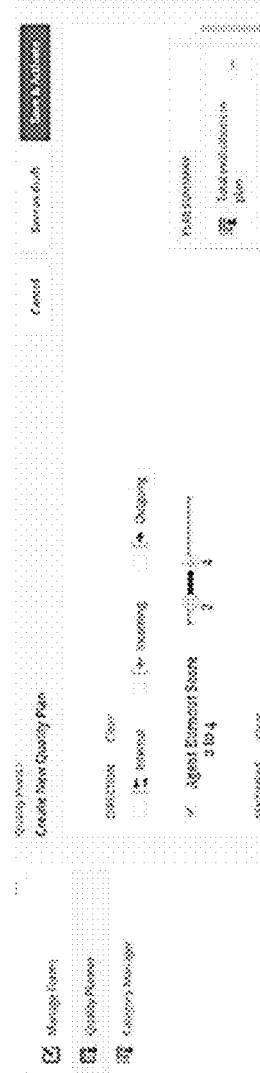
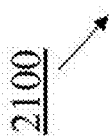
Figure 21

SYSTEM AND METHOD FOR MEASURING AGENT-BURNOUT INDEX AND IDENTIFYING A ROOT-CAUSE IN A CONTACT CENTER

COPYRIGHT NOTICE

TECHNICAL FIELD

The present disclosure relates to the field of data analysis and more specifically to system and method for measuring agent-burnout index and identifying a root-cause to operate a corrective action in a contact center.

BACKGROUND

Contact center burnout is a psychological phenomenon characterized by chronic workplace stressors, due to several factors, that exceed an agent's ability to cope effectively, resulting in emotional exhaustion, depersonalization, and reduced personal accomplishment.

One of the factors is the agent facing technological challenges by the frequent switching between multiple applications and systems which can be overwhelming, leading to inefficiencies and errors in their work. Learning and adapting to new technologies can also be time-consuming and frustrating, especially for agents who does not have a strong technical background. Additionally, technical issues and system failures can further exacerbate stress and frustration, as agents struggle to provide timely and effective support to customers.

Another factor may be continuous assessments and evaluations by the constant monitoring and scrutiny of agent performance, call quality, and adherence to scripts which can create a sense of constant pressure and surveillance. Agents may feel micromanaged and undervalued, leading to a decline in morale and motivation. Also, unrealistic performance targets and expectations can contribute to feelings of inadequacy and anxiety, as agents strive to meet unattainable standards.

Yet another factor may be stringent shift timings. By operating contact centers with stringent shift timings, especially overnight or during rush hour periods, can disrupt agents' natural sleep cycles and lead to sleep deprivation. This can have serious consequences for agents' physical health and mental well-being, as chronic sleep deprivation is associated with increased risk of fatigue, depression, and other health problems. Moreover, irregular working hours can strain personal relationships and make it difficult for agents to maintain a healthy work-life balance.

Yet another factor may be performance metrics and Key Performance Indicators (KPI)s. The demand for strict adherence to KPIs, such as resolution time, customer satisfaction index, and call handling quotas creates a high-pressure environment where agents feel constantly under scrutiny. This pressure to meet or exceed performance targets can lead to heightened levels of stress and anxiety, as agents fear the consequences of falling short of expectations. Additionally, focusing solely on quantitative metrics may overlook the qualitative aspects of customer service and fail to recognize agents' efforts to provide personalized and empathetic support.

Agents burnout may result in a high attrition rate. The pervasive issue of burnout contributes to significantly high attrition rates within contact centers, with some experiencing turnover rates exceeding 40%. High turnover not only disrupts operations and increases recruitment costs but also erodes team morale and cohesion. Constantly losing experienced agents and having to train new hires can create a cycle of instability and inefficiency, further exacerbating burnout among remaining staff members. Addressing burnout and improving employee retention should be a priority for contact center management to ensure long-term success and sustainability.

Agents may experience a sense of emotional depletion and emotional exhaustion due to the constant interaction with customers who may be upset, angry, or demanding. This can lead to feelings of frustration, irritability, and a diminished capacity for empathy, making it challenging for agents to maintain a positive attitude and provide effective customer service.

The repetitive nature of tasks, combined with the pressure to adhere to strict scripts and meet performance metrics, can overwhelm agents mentally and result in mental exhaustion. This can result in decreased concentration, memory problems, and difficulty making decisions, as agents struggle to keep up with the demands of their role.

Sitting for long periods, often in front of a computer screen, can lead to physical exhaustion along with physical symptoms such as fatigue, headaches, and muscle tension. Additionally, the high-pressure nature of the work environment can contribute to sleep disturbances, as agents may find it difficult to relax and unwind after work.

When agents feel undervalued or unappreciated, their overall job satisfaction diminishes. This can be exacerbated by a lack of opportunities for growth and advancement within the organization, leading to feelings of stagnation and disengagement.

Burnout can significantly impair an agent's ability to perform their job effectively. This may manifest as errors in handling customer inquiries, decreased productivity, and ultimately, negative impacts on customer satisfaction and loyalty. It may often lead to higher rates of absenteeism, as agents may feel too exhausted or overwhelmed to come to work. Additionally, burnout can drive talented employees to seek employment elsewhere, resulting in high turnover rates within the contact center, which further disrupts operations and increases recruitment costs.

Prolonged exposure to stress and burnout can take a toll on an agent's mental health, potentially leading to anxiety disorders, depression, or other mental health issues if left unaddressed. This not only affects the individual's well-being but also their ability to perform effectively in their role.

Moreover, burnout can create a toxic work environment, characterized by increased conflict among team members, decreased collaboration, and a breakdown in communication. This can further exacerbate burnout for individual agents and contribute to a negative cycle within the team.

Accordingly, there is a need for a technical solution for continuously measuring an agent-burnout index and identifying root cause factors.

SUMMARY

There is thus provided, in accordance with some embodiments of the present disclosure, a computerized-method for calculating an agent-burnout index and identifying root-cause factors.

Furthermore, in accordance with some embodiments of the present disclosure, the computerized-method may include: (i) for each agent in an agents-database: a. calculating the agent-burnout index by operating a burnout-detection module and storing the agent-burnout index in the agents-database. The agent-burnout index may indicate a level of stress and exhaustion of the agent; b. identifying root-cause factors of the calculated agent-burnout index by operating root-cause analyzer module and storing the identified root-cause factors in the agents-database; and (ii) automatically sending a push-notification to a user with details of agent-burnout index for each agent in the agents-database. The push-notification may be displayed via a User Interface (UI) associated to a Workforce Management (WFM) application that is running on a computerized-device of the user.

Furthermore, in accordance with some embodiments of the present disclosure, the computerized-method may further include operating a burnout-transition monitor module to continuously check the agent-burnout index of each agent in the agents-database, and determining the corrective action for the identified root cause factors when the calculated agent-burnout index is above a preconfigured burnout-threshold by operating a remedy-recommender module.

Furthermore, in accordance with some embodiments of the present disclosure, the burnout-detection module may include: (i) continuously monitoring interactions of the agent during a first preconfigured period to collect interaction related data and to randomly collect audio segments of the interaction as voice samples; (ii) analyzing quantitative-performance-metrics in the collected data based on one or more performance-categories to yield Average Handling Time (AHT) and First Call Resolution (FCR) for each interaction; (iii) analyzing the voice samples of the agent to yield one or more parameters and classifying the one or more parameters by operating Machine Learning (ML) algorithms. The one or more parameters may include at least one of: a. speech patterns; b. tone; and c. cadence, (iv) calculating quality-performance-metrics for each interaction based on the yielded one or more parameters; and (v) calculating the agent-burnout index based on formula I:

$$BS = \int_0^t (HV + EL + RT + LA + PP + IT + PE) \cdot e^{\frac{t-s}{T1}} \cdot e^{\frac{s}{T2}} \qquad (I)$$

whereby:
BS is a Burnout Score which is a calculation of the agent-burnout index,
HV is High Call Volume, which indicates interactions volume above a threshold during a specified period when the interaction has been conducted,
EL is Emotional Labor, determined by sentiment analysis tools that automatically evaluate an emotional tone and stress levels in interactions of the agent,
RT is Repetitive Tasks, evaluated by analyzing task logs to identify and count frequency of repetitive tasks performed by the agent,
LA is Lack of Autonomy, is a measure of control the agent has over work and decision-making processes,
PP is Performance Pressure, which is measured by automatically comparing performance targets with performance metrics of the agent to identify deviations that indicate pressure, IA is Inadequate Training, evaluated by analyzing training completion rates and correlating them with performance data of the agent to identify gaps in training effectiveness,
PE is Physical Environment, which measures level of impact of workspace conditions on agents' comfort and performance, and
IB is Inadequate Breaks, monitored by tracking agents' break times and durations automatically through time-keeping systems and identifying patterns of inadequate breaks.

Furthermore, in accordance with some embodiments of the present disclosure, the one or more performance-categories may include for each interaction at least one of: (i) call-duration; (ii) resolution-time; (iii) First Call Resolution (FCR); (iv) Hold Time; (v) After-Call Work Time; (vi) Transfer Rate; and (vii) Average Handling Time.

Furthermore, in accordance with some embodiments of the present disclosure, the one or more quality-performance-metrics may include at least one of: (i) Customer Satisfaction Score (CSAT); (ii) professionalism; (iii) communication skills; (iv) script adherence; (v) regulatory compliance; (vi) call resolution accuracy; and (vii) level of tiredness.

Furthermore, in accordance with some embodiments of the present disclosure, the operating of the root-cause analyzer module may include: (i) retrieving burnout-parameters from the agents-database; (ii) training a Machine Learning (ML) model on the retrieved burnout-parameters; (iii) operating a feature importance analysis to identify level of relevance of each parameter in predicting the agent-burnout index; (iv) marking a preconfigured number of factors from the one or more factors, having highest level of relevance as the root-cause factors; and (v) storing the root-cause factors in the agents-database.

Furthermore, in accordance with some embodiments of the present disclosure, the burnout-parameters may be categorized as features or agent-burnout index.

Furthermore, in accordance with some embodiments of the present disclosure, the burnout-parameters may be at least one of: (i) call volume above a threshold during a specified period; (ii) emotional labor; (iii) agent-burnout index; (iv) repetitive tasks; (v) lack of autonomy; (vi) performance pressure; (vii) inadequate training; (viii) physical environment; and (ix) inadequate breaks.

Furthermore, in accordance with some embodiments of the present disclosure, the ML model may be Random Forest Regressor model and the level of relevance of each parameter may be identified based on decrease in node impurity.

Furthermore, in accordance with some embodiments of the present disclosure, the operating of the remedy-recommender module may include: (i) generating a template-text that includes the agent-burnout index, the identified root-cause factors, and a number of remedies in the corrective action; (ii) constructing a prompt based on the template-text; (iii) forwarding the prompt to a Generative Artificial Intelligence (GEN AI) model to receive the corrective action; (iv) analyzing the received corrective action from the Gen AI by operating a Natural Language Processing (NLP) model to extract the remedies; (v) retrieving current remedies associated to the agent from the agents-database; (vi) comparing the extracted remedies with current remedies for the agent; (vii) when there is a match between the extracted remedies and the current remedies repeating operations (ii) to (vi); and (viii) storing the received corrective action in the agents-database.

Furthermore, in accordance with some embodiments of the present disclosure, the computerized-method may further include configuring one or more applications to automatically operate the corrective action corresponding to each agent in the agents-database.

Furthermore, in accordance with some embodiments of the present disclosure, the corrective action may be automatically scheduling at least one of: (i) paid time-off via the WFM application; (ii) routing less interactions than a preconfigured volume-threshold during peak-hours via an Automatic Call Distribution (ACD) application; (iii) stress-relief activity; (iv) training session via the WFM application; and (v) break for a predetermined period of time in a schedule of the agent via the WFM application.

Furthermore, in accordance with some embodiments of the present disclosure, the computerized-method may further include continuously monitoring agent-burnout index during a second preconfigured period to: (i) determine a change in agent-burnout index and automatically operate burnout-category determinations and corresponding corrective action, when the determined change is above a preconfigured threshold; and (ii) detect repetitive burnout patterns.

Furthermore, in accordance with some embodiments of the present disclosure, the operating of the remedy-recommender module may further include determining the corrective action based on the detected repetitive burnout patterns.

Furthermore, in accordance with some embodiments of the present disclosure, the predefined criteria may include at least one of: (i) coherence; (ii) relevance; and (iii) informativeness.

BRIEF DESCRIPTION OF THE DRAWINGS

FIG. 2 is a high-level workflow of a computerized-method for calculating an agent-burnout index and identifying root-cause factors, in accordance with some embodiments of the present disclosure;

FIG. 4 is a high-level workflow of agent-burnout index calculator module, in accordance with some embodiments of the present disclosure;

FIG. 5 is a high-level workflow of agent-burnout index calculation, in accordance with some embodiments of the present disclosure;

FIG. 6 is a graph of agent-burnout index categorization, in accordance with some embodiments of the present disclosure;

FIG. 8 is a high-level workflow of root cause analysis, in accordance with some embodiments of the present disclosure;

FIG. 9 is a graph of agent-burnout index contribution by feature, in accordance with some embodiments of the present disclosure;

FIG. 10 is a high-level workflow of performance impact score calculation, in accordance with some embodiments of the present disclosure;

FIG. 11 is a high-level workflow of burnout transition monitor module, in accordance with some embodiments of the present disclosure;

6

Figure 14:
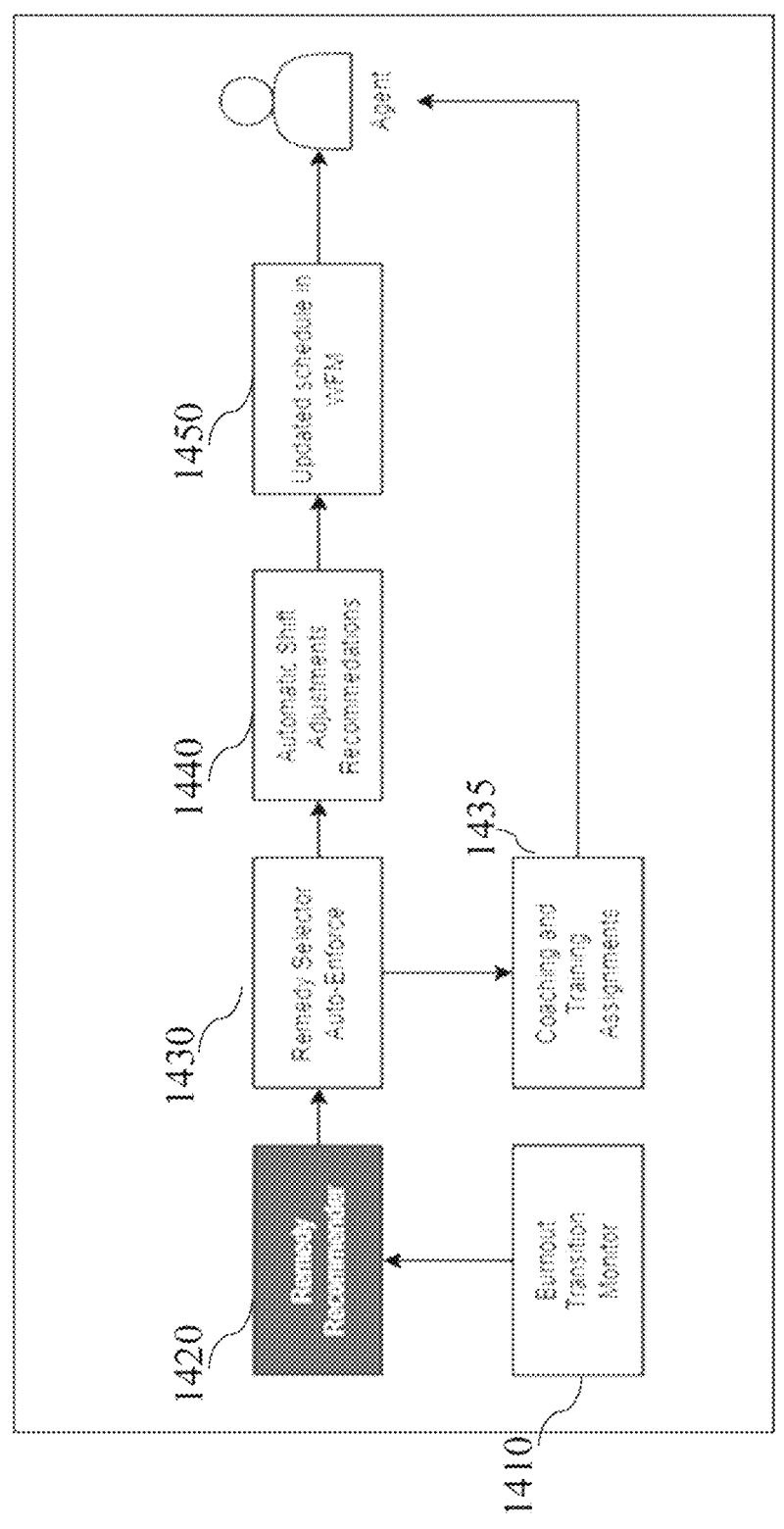
Figure 15A:
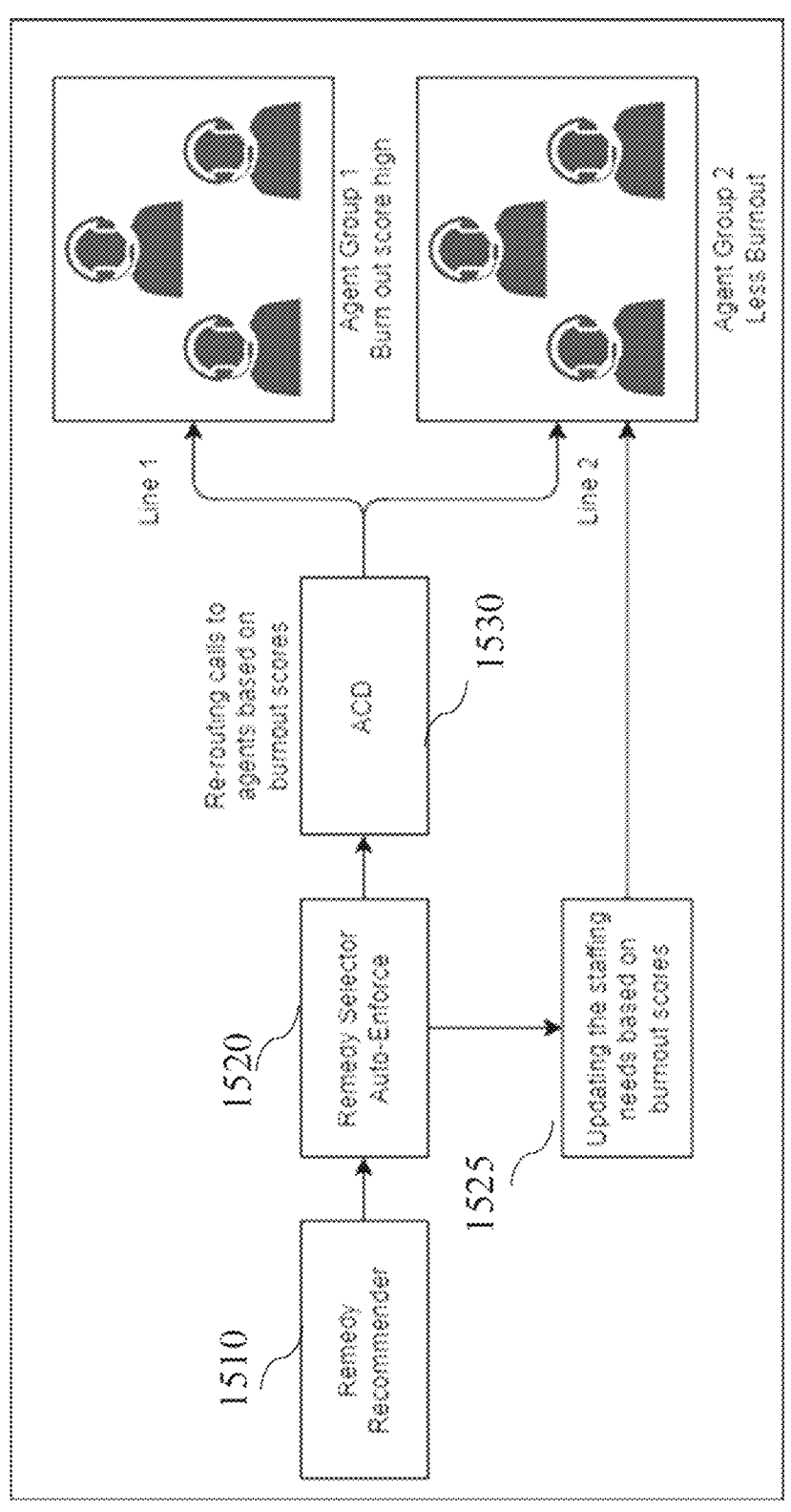
Figure 15B:
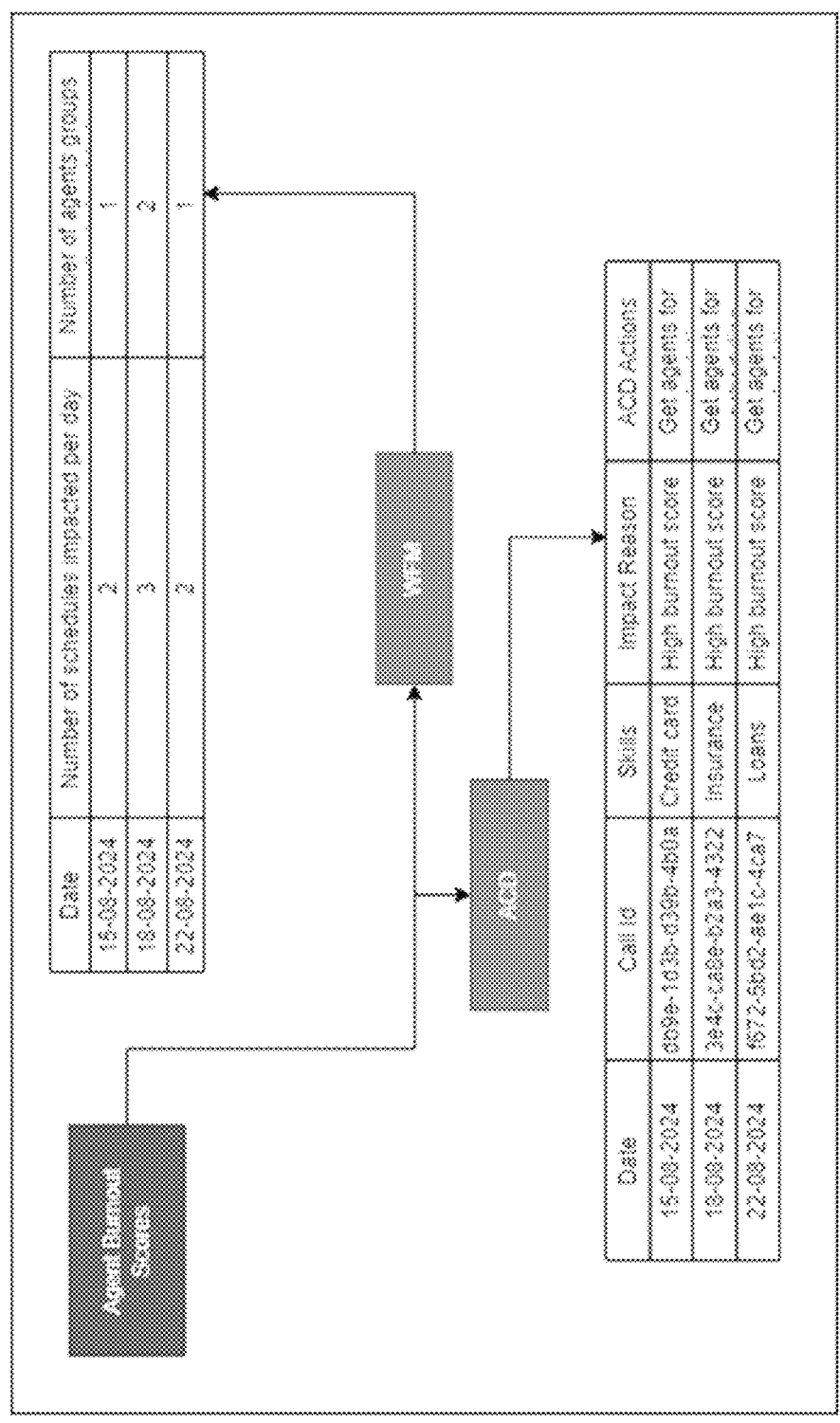
Figure 17:
Figure 18:
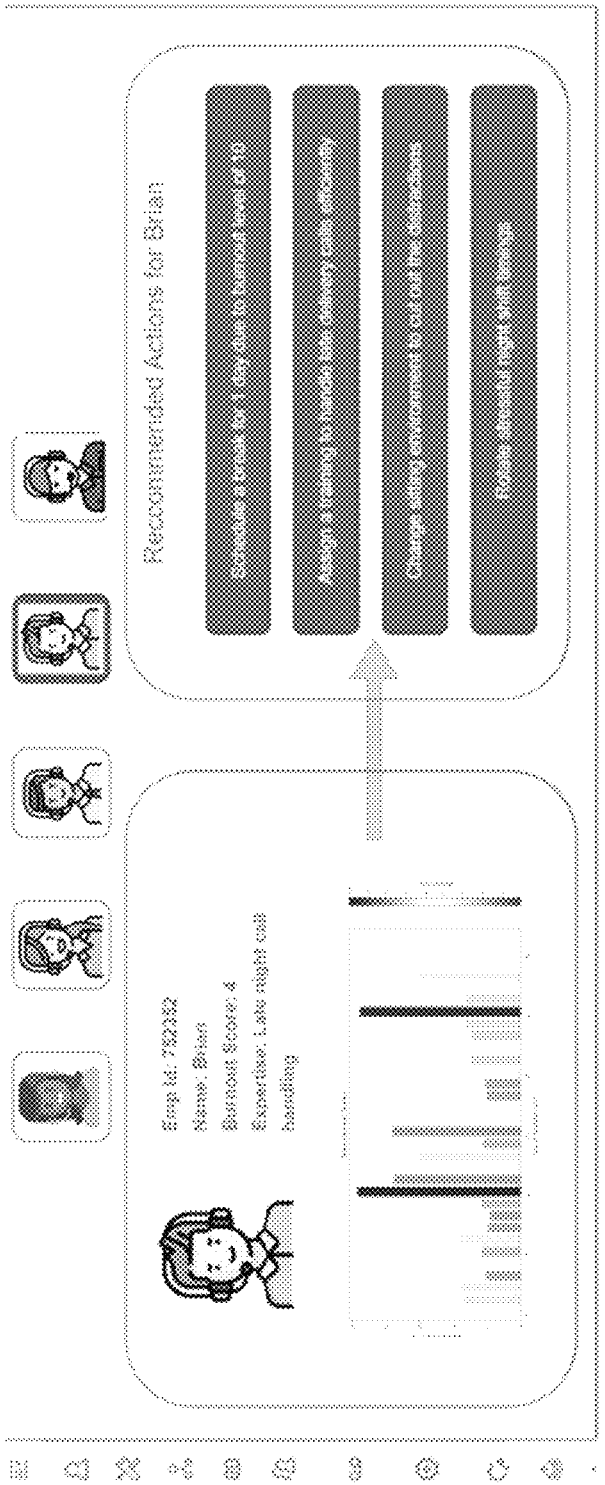
Figure 20:
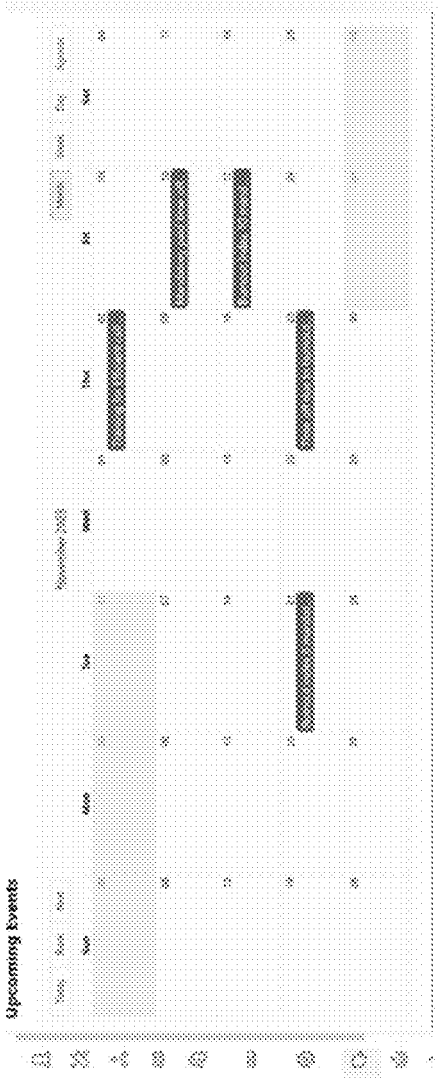
Figure 22:
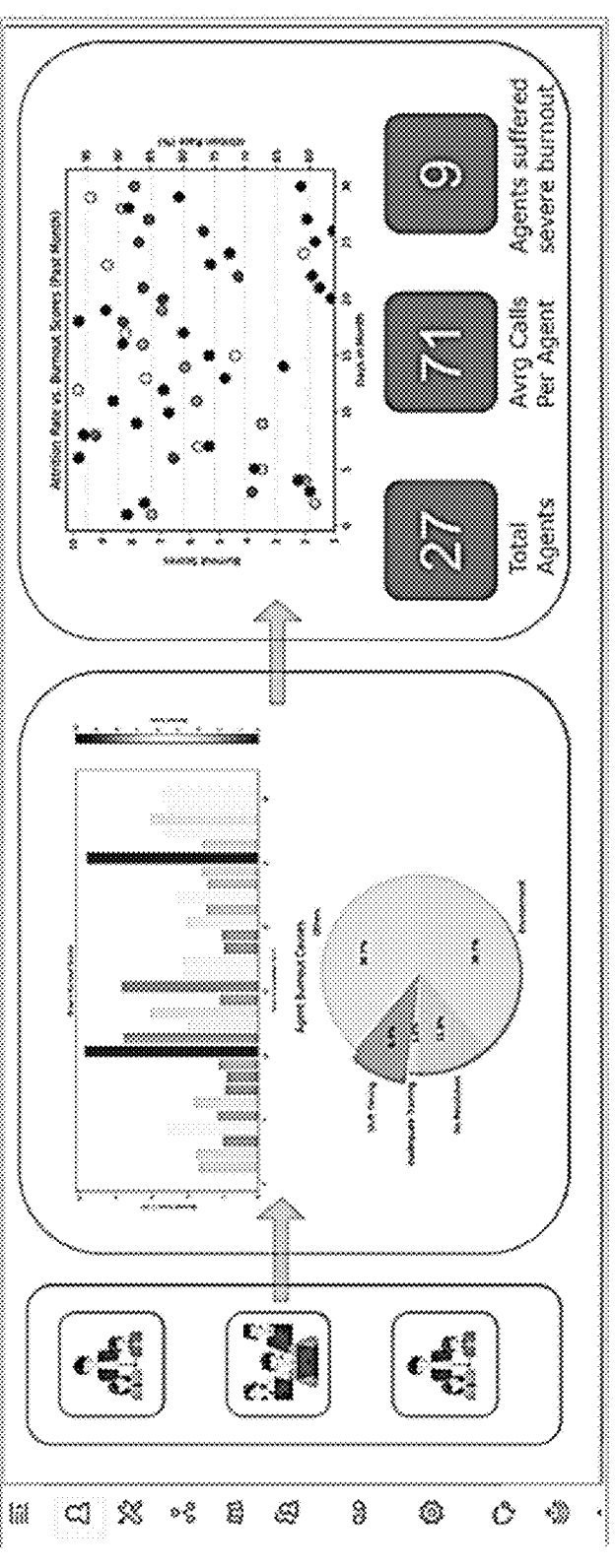

FIG. 12 is a screenshot of a User Interface (UI) associate to a Quality Management (QM) application, in accordance with some embodiments of the present disclosure;

FIG. 13 is a high-level workflow of automatic break and leave schedules, in accordance with some embodiments of the present disclosure;

FIG. 14 is a high-level workflow of shift adjustments and automatic coaching package allocations, in accordance with some embodiments of the present disclosure;

FIGS. 15A-15B are a high-level workflow of call routing decisions based on agent-burnout index, in accordance with some embodiments of the present disclosure;

FIG. 16 is a high-level workflow of prompt generation, in accordance with some embodiments of the present disclosure;

FIG. 17 is a high-level workflow of correction action operation, in accordance with some embodiments of the present disclosure;

FIG. 18 is a screenshot of UI displaying remedies, in accordance with some embodiments of the present disclosure;

FIG. 19 is a screenshot of UI showing a break is forced in the schedule of the agent, in accordance with some embodiments of the present disclosure;

FIG. 20 is a screenshot of an agent's schedule, in accordance with some embodiments of the present disclosure;

FIG. 21 is a screenshot of UI of QM application, in accordance with some embodiments of the present disclosure; and FIG. 22 is a screenshot of UI of assignment of coaching program to an agent for future improvement, in accordance with some embodiments of the present disclosure.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Figure 1A:
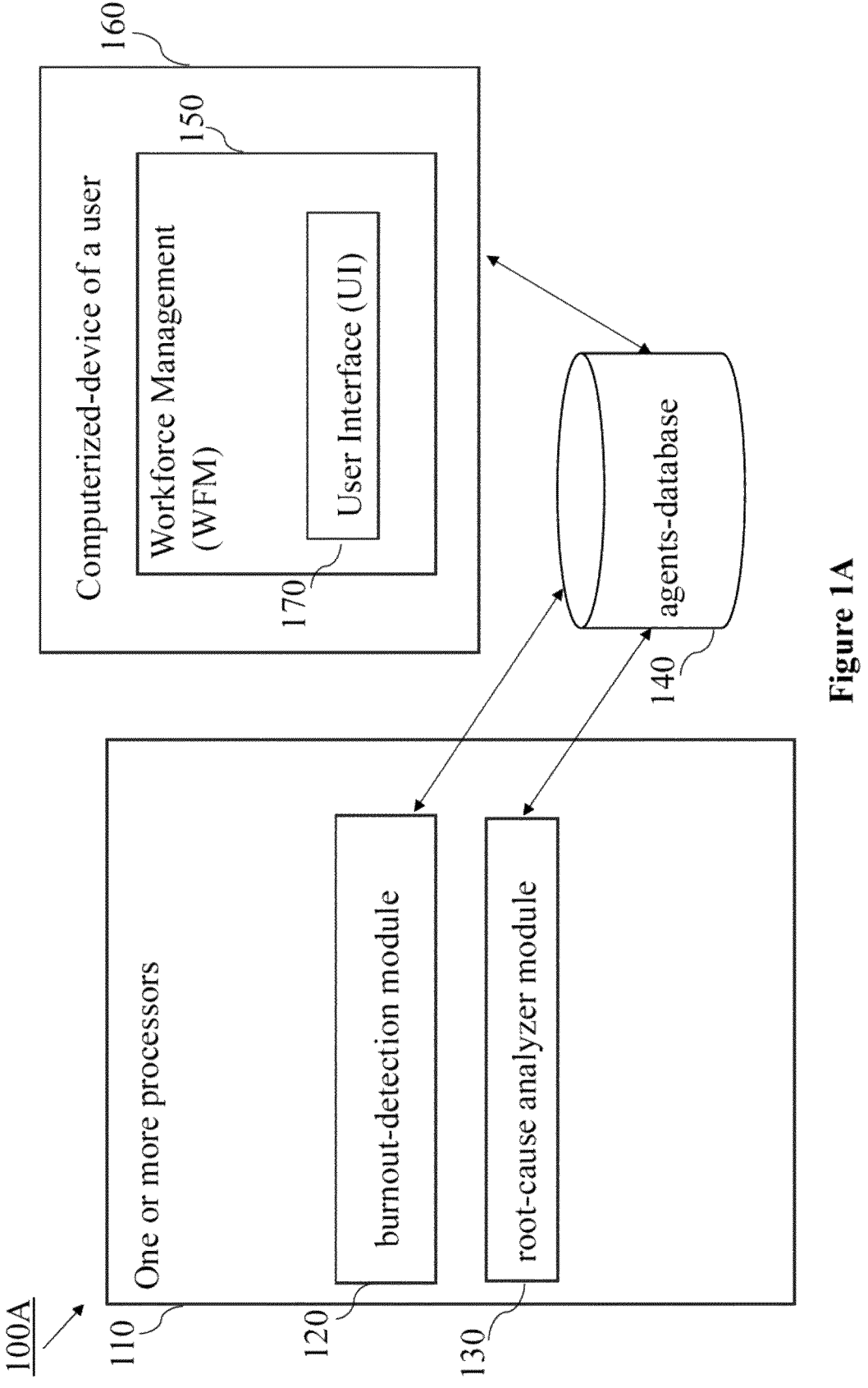
FIGS. 1A-1C schematically illustrate a high-level diagram of a system for calculating an agent-burnout index and identifying root-cause factors, in accordance with some embodiments of the present disclosure.

FIG. 1A schematically illustrates a high-level diagram of a system 100A for calculating an agent-burnout index and identifying root-cause factors, in accordance with some embodiments of the present disclosure.

According to some embodiments of the present disclosure, a system, such as system 100A may continuously monitor burnout levels of each agent in a database, such as agents-database 140 by calculating an agent-burnout index and identifying root-cause factors.

Figure 1B:
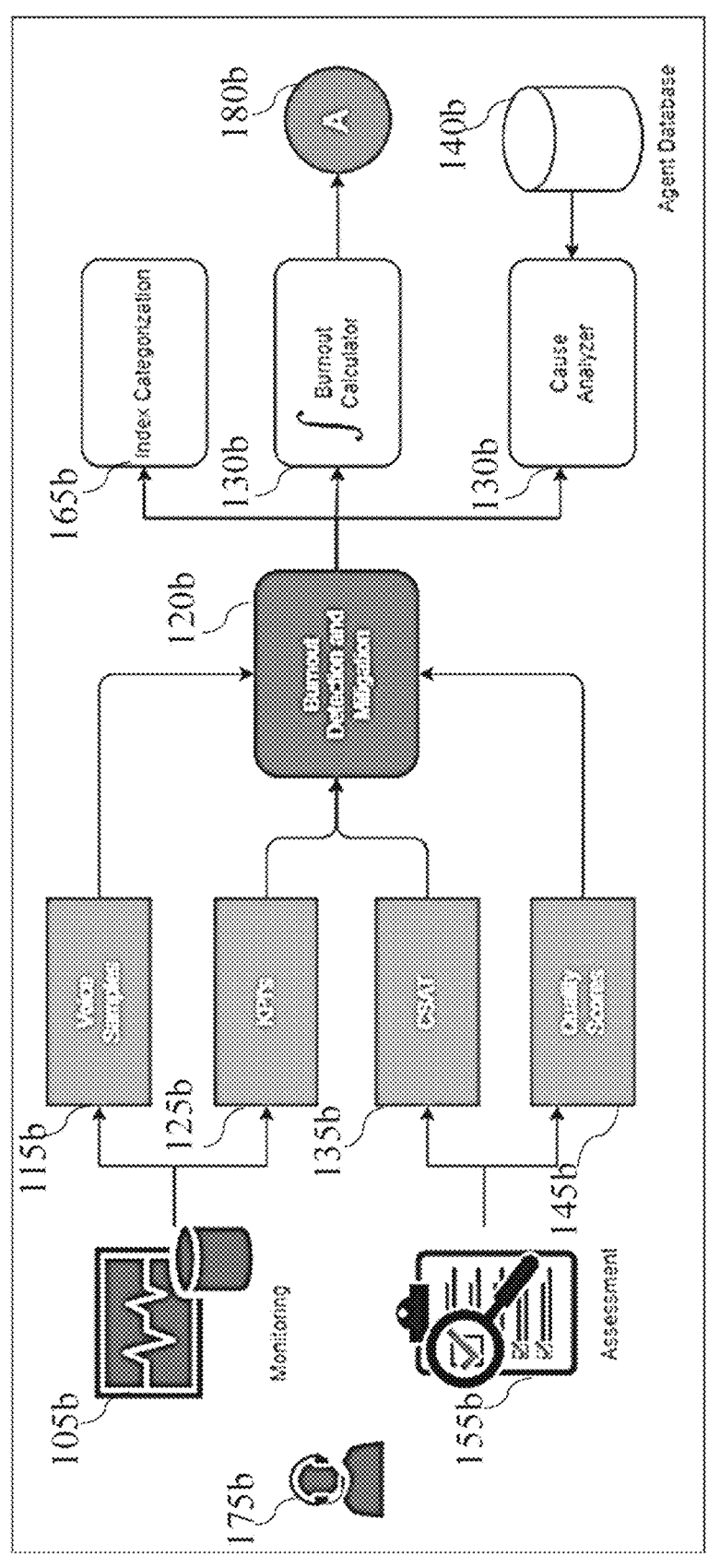

According to some embodiments of the present disclosure, the one or more processors 110 may operate for each agent in agents-database 140, a module, such as burnout-detection module 120, to calculate an agent-burnout index 180b in FIG. 1B, which may be stored in the agents-database 140. The agent-burnout index may indicate a level of stress and exhaustion of the agent.

According to some embodiments of the present disclosure, the burnout-detection module 120 may continuously monitor interactions of the agent during a first preconfigured period to collect interaction related data, such as call duration, number of calls handled, resolution time, hold time, after-call work time, call transfers. Sentiment analysis and to randomly collect audio segments of the interaction as voice samples.

According to some embodiments of the present disclosure, quantitative-performance-metrics may be analyzed based on performance-categories in the collected interaction related data. The performance-categories may include call-duration, resolution-time, First Call Resolution (FCR), Hold Time, After-Call Work Time, Transfer Rate, and Average Handling Time (AHT).

According to some embodiments of the present disclosure, the analysis of the quantitative-performance-metrics may yield AHT and FCR for each interaction.

According to some embodiments of the present disclosure, the voice samples of the interaction of the agent may be analyzed to yield parameters. The yielded parameters may include, for example, speech patterns, tone, and cadence and generally ML algorithms such as Random Forest regressor and Support Vector machine is used to classify voice samples. A typical use of Random Forest Regressor classifies these samples into voice features like pitch, intensity, and spectral characteristics.

According to some embodiments of the present disclosure, quality-performance-metrics may be calculated for each interaction of the agent based on the yielded parameters. The quality-performance-metrics may include Customer Satisfaction Score (CSAT), professionalism, communication skills, script adherence, regulatory compliance, call resolution accuracy, and level of tiredness.

According to some embodiments of the present disclosure, the agent-burnout index 180b in FIG. 1B may be calculated based on formula I:

$$BS = \int_0^t (HV + EL + RT + LA + PP + IT + PE) \cdot e^{\frac{t-s}{T1}} \cdot e^{\frac{s}{T2}} \qquad (I)$$

whereby:

BS is a Burnout Score which is a calculation of the agent-burnout index,

HV is High Call Volume, which indicates interactions volume above a threshold during a specified period when the interaction has been conducted, EL is Emotional Labor, determined by sentiment analysis tools that automatically evaluate an emotional tone and stress levels in interactions of the agent, RT is Repetitive Tasks, evaluated by analyzing task logs to identify and count frequency of repetitive tasks performed by the agent, LA is Lack of Autonomy, which is a measure of control the agent has over work and decision-making processes, PP is Performance Pressure, which is measured by automatically comparing performance targets with performance metrics of the agent to identify deviations that indicate pressure, IA is Inadequate Training, evaluated by analyzing training completion rates and correlating them with performance data of the agent to identify gaps in training effectiveness, PE is Physical Environment, measures level of impact of workspace conditions on agents' comfort and performance, and IB is Inadequate Breaks, monitored by tracking agents' break times and durations automatically through time-keeping systems and identifying patterns of inadequate breaks.

T1 is total time for which agent was available.

T2 is the time for which agent is expected to be available.

t is a variable of integration, which represents total time period for which burnout score is to be calculated, and s is an average value of T1 and T2.

According to some embodiments of the present disclosure, the root-cause factors of the calculated agent-burnout index may be identified by the one or more processors 110 operating a module, such as root-cause analyzer module 130. The identified root-cause factors may be stored in the agents-database 140.

According to some embodiments of the present disclosure, the operating of the root-cause analyzer module 130 may include retrieving burnout-parameters from the agents-database 140 and then training a Machine Learning (ML) model on the retrieved burnout-parameters. The ML model may be for example, Random Forest Regressor model. The factors having highest level of relevance may be identified by the ML model based on decrease in node impurity. The node impurity may measure how mixed or uncertain the target variable values, e.g., root-cause factors such as Stringent shift timings and lack of scheduled paid time off may be within the node and reduced impurity may lead to more accurate predictions by the ML mode.

According to some embodiments of the present disclosure, the Random Forest Regressor model may be an ensemble learning method which may combine multiple decision trees to make predictions. Each tree may be trained on a random subset of data, e.g., quantitative-performance-metrics and quality-performance-metrics and the final prediction may be an average of the predictions of all the trees.

According to some embodiments of the present disclosure, the burnout-parameters may be for example, call volume above a threshold during a specified period, emotional labor, agent-burnout index, repetitive tasks, lack of autonomy, performance pressure, inadequate training, physical environment, and inadequate breaks.

According to some embodiments of the present disclosure, a feature importance analysis may be operated to identify level of relevance of each parameter in predicting the agent-burnout index. Then, a preconfigured number of factors may be marked from the factors having highest level of relevance as the root-cause factors. The root-cause factors may be stored in the agents-database 140.

According to some embodiments of the present disclosure, a user may be notified as to the agent-burnout index of each agent in the agents-database, by an automated push-notification that may be sent with details of the agent-burnout index. The push-notification with the details of the agent-burnout index may be displayed via a User Interface (UI) 170 that may be associated to a Workforce Management (WFM) application 150 that is running on a computerized-device of the user 160. For example, UI 2200 in FIG. 22.

FIG. 1B schematically illustrates a high-level diagram of a system 100B for calculating an agent-burnout index and identifying root-cause factors, in accordance with some embodiments of the present disclosure.

According to some embodiments of the present disclosure, system 100B may include similar components as in system 100A in FIG. 1A.

According to some embodiments of the present disclosure, each agent 175b, in the agents-database 140b, such as agents-database 140 in FIG. 1A, whose calculated agent-burnout index 180b may require mitigation may be the subject of observation and analysis within the system 100B.

According to some embodiments of the present disclosure, inputs, such as burnout data, root cause factors, and recommended interventions, e.g., corrective action for the identified root cause factors, may be provided to the agent 175b from external sources. For example, a corrective action may be an automated scheduled break for a predetermined period of time in a schedule of the agent via the WFM application 150 in FIG. 1A. For example, as shown in UI 1900 in FIG. 19.

According to some embodiments of the present disclosure, in another example, a corrective action may be an automated scheduled paid time-off, which may be scheduled via the WFM application 150 in FIG. 1A. Another corrective action for the agent may be routing less interactions than a preconfigured volume-threshold during peak-hours via an Automatic Call Distribution (ACD) application to the agent.

According to some embodiments of the present disclosure, in yet another example, the corrective action 180b may be automatically scheduling a stress-relief activity scheduled to the agent. In yet another example, the corrective action may be automatically scheduling to the agent a training session via the WFM application 150 in FIG. 1A.

According to some embodiments of the present disclosure, the monitoring module 105b may continuously evaluate various performance metrics and customer satisfaction indicators. These evaluations may be the input used in the calculation of the agent-burnout index. The monitoring module 105b may further facilitate ongoing assessment of agent performance and customer interactions 155b, thus enabling determination of burnout levels by analyzing quantitative-performance-metrics in the collected data based on the performance-categories.

According to some embodiments of the present disclosure, the analysis of the quantitative-performance-metrics may yield Average Handling Time (AHT) and First Call Resolution (FCR) for each interaction and analyzing the voice samples of the agent to yield parameters and classifying the parameters by operating Machine Learning (ML) algorithms.

According to some embodiments of the present disclosure, the assessment module 155b may calculate quality-performance-metrics for each interaction of the agent based on the yielded parameters by providing quality scores 145b and customer satisfaction scores 135b for the agent. The assessment module 155b may systematically evaluate various performance metrics and customer interactions to generate objective quality assessments and subjective satisfaction scores. By leveraging data analytics and ML algorithms, the assessment module may quantify agent performance and customer sentiment, offering valuable insights into the effectiveness of service delivery. These assessments serve as crucial inputs for understanding the agent's overall performance and informing burnout mitigation strategies within the system 100B.

According to some embodiments of the present disclosure, the voice samples 115b of interactions of the agent may be randomly selected audio segments from ongoing interactions. The voice samples 115b may be utilized to assess the fatigue or tiredness levels of the agent 175b. The system 100B may employ ML algorithms to analyze speech patterns, tone, and cadence, extracting features which are indicative of fatigue. These voice samples 115b may be used as objective indicators of the agent's physiological state during customer interactions.

According to some embodiments of the present disclosure, by leveraging advanced signal processing techniques, the system 100B may quantify fatigue levels with precision, enabling real-time monitoring and intervention strategies to alleviate agent burnout.

According to some embodiments of the present disclosure, the voice analysis may be implemented, for example, by utilizing Python libraries, such as Librosa for audio processing and feature extraction, along with Praat or PyAudioAnalysis for pitch detection, extract Mel-Frequency Cepstral Coefficients (MFCCs) and other relevant features. The ML models may be implemented for example, by using Scikit-learn for classification tasks which may employing algorithms like Random Forest Regressor model or Support Vector Machines (SVM) s. The ML model performance may be validated with metrics from an open-source Python library ML models, such as Scikit-learn and optionally techniques like k-fold cross-validation may be operated for a robust evaluation.

According to some embodiments of the present disclosure, the Key Performance Indicators (KPIs) of the agents, such as Average Handling Time (AHT) and First Call Resolution (FCR), may be calculated by KPIs modules 125b. These metrics provide the assessment of agent performance and service quality. The AHT metric measures the average duration taken to handle customer interactions, while the FCR metric evaluates the percentage of calls resolved without escalation. By leveraging these KPIs, operational efficiency, customer satisfaction, and business outcomes may be assessed and optimized. These scores, serve as crucial inputs for evaluating agent performance and informing burnout mitigation strategies within the contact center environment.

According to some embodiments of the present disclosure, the AHT is a contact center metric, used to measure the average length of time it takes to complete an interaction. A lower average handle times may indicate that the contact center is more efficient with its agents. The lower the average handle time, the more interactions each agent can handle. The AHT may be used for workforce management to calculate both the total number of agents needed, as well as to determine schedules. The AHT may be calculated for example, based on the following formula:

$$AHT = (\text{Total Talk Time} + \text{Total Hold Time} + \text{After Call Work Time})/$$

$$\text{Total Number of interactions Handled.}$$

According to some embodiments of the present disclosure, the FCR is a contact center metric that measures the percentage of customer contacts that are resolved on the first try. The FCR is correlated with contact center efficiency and costs as well as customer satisfaction because customers whose issues are fixed with just one interaction may be more satisfied than customers that require multiple interactions to achieve resolution. The FCR may be calculated for example, based on the following formula:

$$FCR = \left( \text{Number of Calls Resolved} \right.$$
$$\left. \text{on First Attempt/Total Number of First Calls} \right) \times 100$$

According to some embodiments of the present disclosure, quality scores within a contact center framework constitute an established module, assessing an agent's performance against predefined criteria. These criteria encompass professionalism, communication skills, script adherence, and regulatory compliance, alongside metrics like call resolution accuracy and customer satisfaction ratings. By leveraging advanced analytics techniques, such as sentiment analysis and speech recognition, this module ensures nuanced evaluation of customer interactions. The assessment may yield CSAT 135*b* and quality scores 145*b*. The quality scores 145*b* assist in maintaining consistent service standards and meeting organizational excellence benchmarks in customer support. By utilizing these quality scores 145*b*, organizations pinpoint improvement areas, deliver targeted training, and streamline operational processes for enhanced service quality and customer satisfaction levels within the contact center environment.

According to some embodiments of the present disclosure, by gathering post-interaction survey data, organizations may assess not only the quality of service provided by agents but also the impact of customer interactions on agent well-being. High levels of CSAT 135*b* may correlate with lower agent stress levels, indicating effective service delivery and reduced burnout risk. Conversely, consistently low satisfaction scores may signal areas of heightened stress and potential burnout among agents. By incorporating customer satisfaction metrics into the calculation of burnout scores, organizations gain valuable insights into the relationship between service quality, customer experience, and agent well-being. This data-driven approach enables proactive identification of burnout risk factors and facilitates targeted interventions to mitigate stress and enhance overall agent satisfaction within the contact center environment.

According to some embodiments of the present disclosure, the CSAT metric is a measurement of how well a business is satisfying its customers with the products, services, or interactions it provides. The CSAT may be calculated for example based on the following formula:

$$CSAT =$$
$$\left( \text{Number of Satisfied Customers/Total Number of Responses} \right) \times 100.$$

According to some embodiments of the present disclosure, the burnout detection and mitigation model 120*b* may implement an AI-driven system designed to analyze and mitigate factors contributing to burnout of agents. By leveraging data analysis techniques and continuous monitoring capabilities, the burnout detection and mitigation model

120*b* may identify patterns and trends indicative of burnout risk, such as increased absenteeism, declining performance metrics like quality scores and FCR rates, longer handle times, and higher call transfer rates. Behavioral indicators, such as negative sentiment in interactions. By synthesizing this information, burnout detection and mitigation model 120*b* may generate personalized corrective actions tailored to address specific needs and challenges faced by individuals. These corrective actions may be informed by real-time data insights and adaptive algorithms, ensuring effectiveness and relevance.

According to some embodiments of the present disclosure, the burnout detection and mitigation model 120*b* may operate as a proactive solution, aiming to prevent burnout before it escalates by providing timely interventions and support.

Figure 1C:
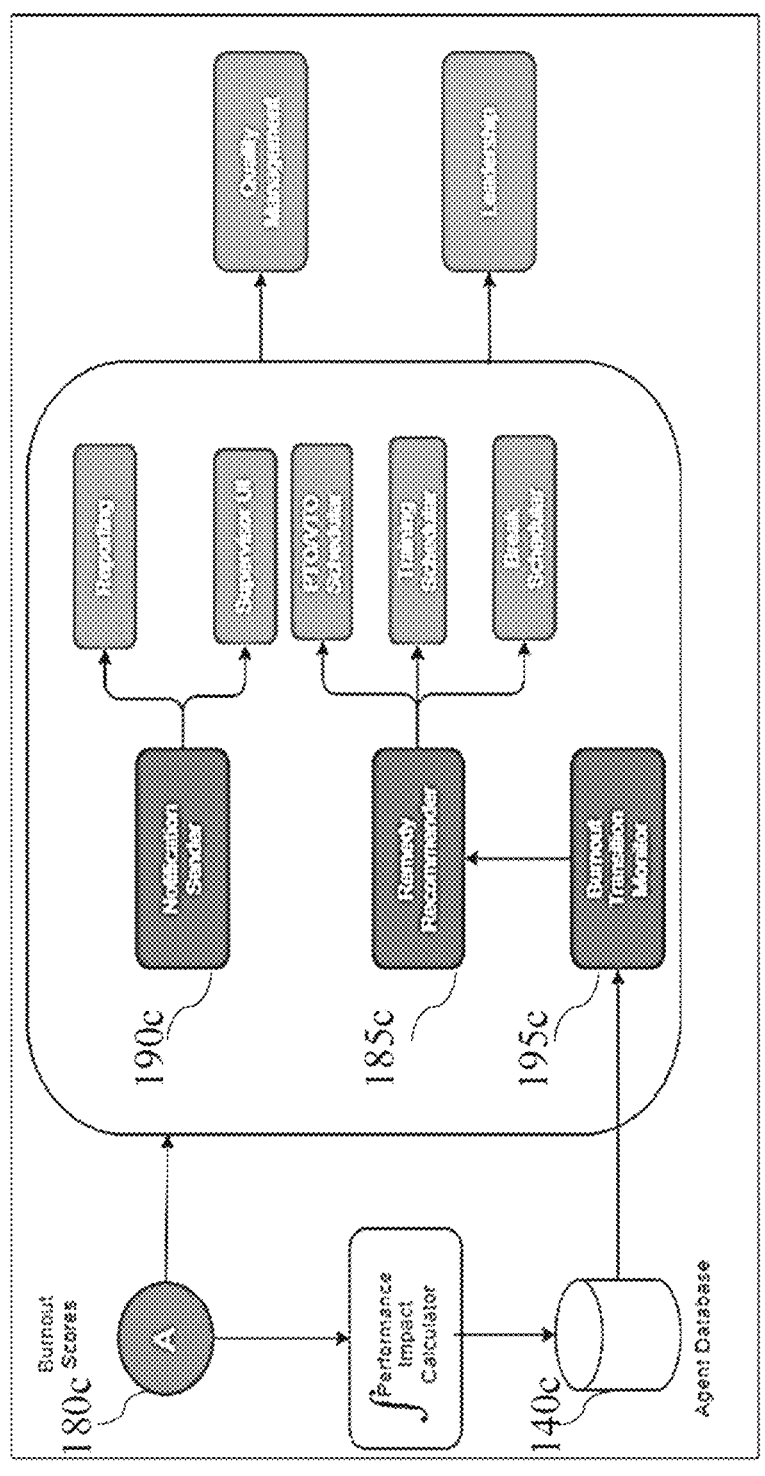

According to some embodiments of the present disclosure, the burnout detection and mitigation model 120*b* may implement a remedy-recommender module, such as remedy recommender 185*c* in FIG. 1C. The remedy-recommender module may assess the identified root-cause factors, such as high call volumes and repetitive shift schedules. The root-cause factors may be identified by a cause analyzer 130*b*, such as root-cause analyzer module 130.

According to some embodiments of the present disclosure, the burnout detection and mitigation model 120*b* may consider the detected repetitive burnout patterns which were identified by a burnout transition monitor 195*c* in FIG. 1C. The repetitive burnout patterns may be for example, frequent transitions between tasks or heightened workload during certain shifts. By analyzing these root cause factors and patterns, personalized recommendations for mitigating burnout and improving well-being within the contact center environment may be generated.

According to some embodiments of the present disclosure, the calculation of the agent-burnout index may be operated by a burnout calculator 130*b* within the burnout-detection module 120 in FIG. 1A. The burnout calculator 130*b* may operate the burnout analysis by extracting relevant data, such as workload intensity and stress levels. It then may normalize this data to ensure fair comparison across different metrics. The burnout calculator 130*b* may calculate the agent-burnout index by weighing each normalized factor.

According to some embodiments of the present disclosure, the agent-burnout index may be calculated based on formula I:

$$BS = \int_0^t (HV + EL + RT + LA + PP + IT + PE) \cdot e^{\frac{t-s}{T1}} \cdot e^{\frac{s}{T2}} \tag{I}$$

whereby:
BS is a Burnout Score which is a calculation of the agent-burnout index,
HV is High Call Volume, which indicates interactions volume above a threshold during a specified period when the interaction has been conducted,
EL is Emotional Labor, determined by sentiment analysis tools that automatically evaluate an emotional tone and stress levels in interactions of the agent,
RT is Repetitive Tasks, evaluated by analyzing task logs to identify and count frequency of repetitive tasks performed by the agent,
LA is Lack of Autonomy, is a measure of control the agent has over work and decision-making processes, PP is Performance Pressure, which is measured by auto-
matically comparing performance targets with perfor-
mance metrics of the agent to identify deviations that
indicate pressure, IA is Inadequate Training, evaluated by analyzing training
completion rates and correlating them with perfor-
mance data of the agent to identify gaps in training
effectiveness, PE is Physical Environment, which measures level of
impact of workspace conditions on agents' comfort and
performance, and IB is Inadequate Breaks, monitored by tracking agents'
break times and durations automatically through time-
keeping systems and identifying patterns of inadequate
breaks.

T1 is total time for which agent was available.

T2 is the time for which agent is expected to be available.

t is a variable of integration, which represents total time
period for which burnout score is to be calculated, and s is an average value of T1 and T2.

According to some embodiments of the present disclo-
sure, the agent database 140b may store information, such as
records of previous burnout indices calculated for the agent
over time. These indices quantify the level of burnout
experienced by the agent at different points in time, provid-
ing insights into trends and patterns of burnout occurrence.
Detailed information on the root cause factors or contribut-
ing factors identified for earlier instances of burnout may be
also stored in the agent database 140b. These may include
factors, such as high workload, inadequate support, role
ambiguity, or other stressors encountered by the agent.

FIG. 1C schematically illustrates a high-level diagram of
a system 100C for calculating an agent-burnout index and
identifying root-cause factors, to operate a corrective action,
in accordance with some embodiments of the present dis-
closure.

According to some embodiments of the present disclo-
sure, system 100C is part of system 100B in FIG. 1B.

According to some embodiments of the present disclo-
sure, agent-burnout index 180c of the agent may be used
with CSAT and quality scores for calculating performance
impact scores. The performance impact scores may be stored
in the agent database 140c, such as agent database 140b in
FIG. 1B. These performance impact scores may be metrics
assessing the impact of burnout on the agent's performance.
These scores quantify how burnout has affected various
aspects of the agent's work, such as productivity, quality of
service, and customer satisfaction ratings.

According to some embodiments of the present disclo-
sure, the operating of the remedy-recommender module
185c may include generating a template-text that includes
the agent-burnout index, the identified root-cause factors,
and a number of remedies in the corrective action. Then, a
prompt based on the template-text may be constructed. The
prompt may be forwarded to a Generative Artificial Intelli-
gence (GEN AI) model to receive the corrective action. The
generating of the template-text may be operated by defining
a structured format that includes the necessary elements, by
creating a template structure that organizes these elements in
a logical and coherent manner and automatically inserting
the relevant data into the predefined template.

According to some embodiments of the present disclo-
sure, the received corrective action from the Gen AI may be
analyzed by operating a Natural Language Processing (NLP)
model to extract the remedies. Current remedies associated to the agent may be retrieved from the agents-database 140b
and compared with the extracted remedies with current
remedies for the agent.

According to some embodiments of the present disclo-
sure, when there is a match between the extracted remedies
and the current remedies, then since the agent-burnout index
has a change above a preconfigured threshold the match
between current and extracted remedies shows that previ-
ously generated remedies were not sufficient to bring the
burnout index down as expected. Hence, regeneration of the
remedies will take place until new remedies are found.
Repeating the construction of the prompt and the following
operations to receive different remedies. The received cor-
rective action may be stored in the agent database 140c.

According to some embodiments of the present disclo-
sure, a continuous monitoring of agent-burnout index during
a second preconfigured period may be operated by a burnout
transition monitor 195c, which may operate as the data
source for the remedy recommender 185c. The burnout
transition monitor 195c may stream pertinent data in real-
time, or alternatively, the remedy recommender 185c may
retrieve data at rest from the burnout transition monitor
195c.

According to some embodiments of the present disclo-
sure, upon the burnout transition monitor 195c determina-
tion of a change above a preconfigured threshold in the
agent-burnout index, a burnout-category determination, e.g.,
index categorization 165b in FIG. 1B may be operated and
a corresponding corrective action. For example, as shown in
graph 600 in FIG. 6.

According to some embodiments of the present disclo-
sure, the remedy recommender 185c may analyze the root
cause factors of burnout that have been identified by the
cause analyzer 130b, such as high call volumes, repetitive
shift timings, or other contributing factors.

According to some embodiments of the present disclo-
sure, the burnout transition monitor 195c, may detect repeti-
tive burnout patterns which may be later on used by a
remedy-recommender module 185c to determine the correc-
tive action.

According to some embodiments of the present disclo-
sure, based on the analysis, the remedy recommender 185c
may generate a set of dynamic remedies tailored to address
the identified root cause factors of the agent-burnout index
180c. The purpose of these remedies is to provide practical
solutions to alleviate burnout and promote agent well-being.

According to some embodiments of the present disclo-
sure, for example, if the root cause analysis may indicate that
high call volumes are contributing to a high agent-burnout
index 180c, the remedy recommender 185c may suggest
remedies, such as encouraging agents to take paid time off,
providing additional resources or support during peak call
hours, implementing workload management strategies, or
offering stress-relief activities.

According to some embodiments of the present disclo-
sure, when the burnout transition monitor 195c may detect
repetitive burnout patterns associated with specific shift
timings, it may forward the data to the remedy recommender
185c which may recommend remedies, such as adjusting
shift schedules, implementing flexible work arrangements,
or providing training or resources to help agents cope with
the demands of their shifts more effectively.

According to some embodiments of the present disclo-
sure, the remedy recommender 185c may address burnout of
the agent by offering targeted remedies that address the
underlying causes identified through root cause analysis and
burnout pattern monitoring.

According to some embodiments of the present disclosure, the burnout transition monitor 195c may track the frequency of shifts and may update the agent database 140c. It may provide an analysis of the agent's work patterns and may facilitate the managing and mitigation of the risks of burnout of agents. The burnout transition monitor 195c may be part of burnout prevention strategy by enabling proactive measures to be implemented based on the detected patterns.

According to some embodiments of the present disclosure, a module, such as notification sender 190c may be operated to notify a user as to the agent-burnout index for each agent in the agent database 140c, by an automated push-notification that may be sent with details of the agent-burnout index 180c. The push-notification with the details of the agent-burnout index 180c may be displayed via a User Interface (UI) 170 in FIG. 1A, that may be associated to a Workforce Management (WFM) application 150 in FIG. 1A, that is running on a computerized-device of the user 160 in FIG. 1A. For example, UI 2200 in FIG. 22.

According to some embodiments of the present disclosure, the notification sender 190c may transmit notifications to a computerized-device of a user, such as a supervisor which may be displayed via a UI. By leveraging predefined triggers or algorithms, the notification sender 190c may identify and communicate occurrences of burnout to users, thus enabling timely intervention and support. The notifications may be delivered via the UI in a structured format, ensuring that the users may be informed of critical events. This facilitates proactive management of agent well-being and allows supervisors to take appropriate actions to address burnout within the contact center environment.

According to some embodiments of the present disclosure, a Quality Management (QM) application may store historical agent data, including burnout indices, root cause factors of burnout, and performance impact scores. The QM application may filter interactions for evaluation based on the agent-burnout index. For example, the Quality Management (QM) system utilizes the burnout index to distribute interactions based on given index. The quality plan will allocate recorded calls only within a specified range of the agent's burnout score for evaluation. This serves as a valuable data point for evaluators to investigate root causes of performance issues, gaps in knowledge, inefficient processes, or other factors contributing to agent burnout.

According to some embodiments of the present disclosure, the QM application may also filter interactions for evaluation based on root cause factors of burnout. For example, if an agent's burnout is linked to high call volume, the QM system can prioritize evaluating interactions that occurred during peak call times. Similarly, if long call durations are identified as a burnout factor, the system can select longer calls for review. This targeted evaluation helps identify specific stress factors and enables more precise interventions or based on performance impact scores. For example, if the performance impact score indicates problems with customer satisfaction, the system can filter and select calls with low customer satisfaction ratings for detailed evaluation. This approach ensures that evaluations focus on interactions most indicative of performance gaps and areas needing improvement.

FIG. 2 is a high-level workflow of a computerized-method 200 for calculating an agent-burnout index and identifying root-cause factors, in accordance with some embodiments of the present disclosure.

According to some embodiments of the present disclosure, operation 210 comprising for each agent in an agents-database: a. calculating the agent-burnout index by operat-ing a burnout-detection module and storing the agent-burnout index in the agents-database. The agent-burnout index indicates a level of stress and exhaustion of the agent; and b. identifying root-cause factors of the calculated agent-burnout index by operating root-cause analyzer module and storing the identified root-cause factors in the agents-database.

According to some embodiments of the present disclosure, operation 220 comprising automatically sending a push-notification to a user with details of agent-burnout index for each agent in the agents-database. The push-notification is displayed via a User Interface (UI) associated to a Workforce Management (WFM) application that is running on a computerized-device of the user.

Figure 3:
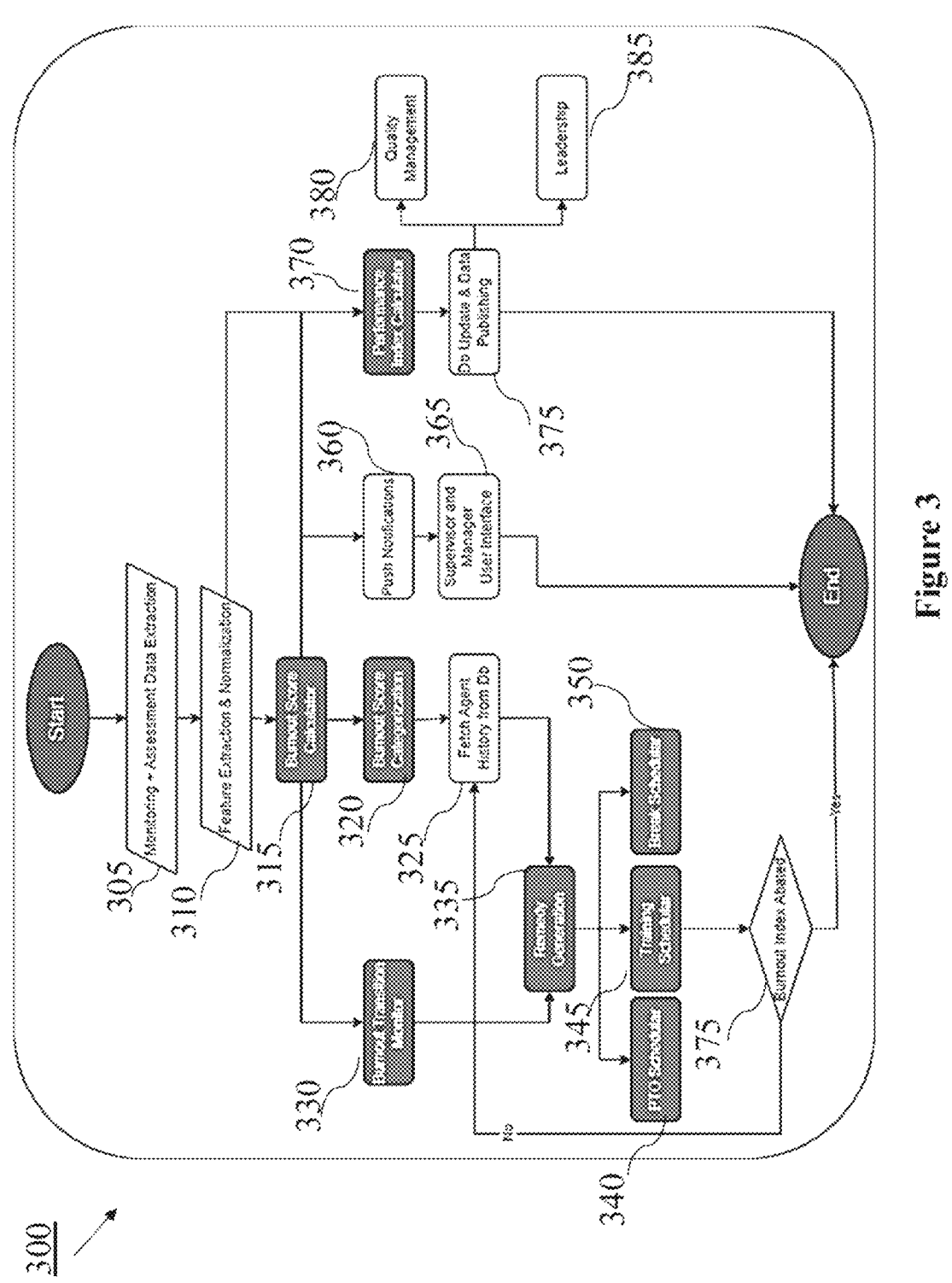
FIG. 3 is a high-level workflow of burnout-detection module 300, in accordance with some embodiments of the present disclosure.

FIG. 3 is a high-level workflow of burnout-detection module 300, in accordance with some embodiments of the present disclosure.

According to some embodiments of the present disclosure, the burnout-detection module 300, such as burnout-detection module 120 in FIG. 1A, may monitor and operate assessment data extraction 305. Then, the burnout-detection module 300 may operate feature extraction and normalization of the data 310. The burnout score calculator 315 may calculate the agent-burnout index.

According to some embodiments of the present disclosure, the agent-burnout index may be calculated based on formula I:

$$BS = \int_0^t (HV + EL + RT + LA + PP + IT + PE) \cdot e^{\frac{t-s}{T1}} \cdot e^{\frac{s}{T2}} \tag{I}$$

whereby:

BS is a Burnout Score which is a calculation of the agent-burnout index,

HV is High Call Volume, which indicates interactions volume above a threshold during a specified period when the interaction has been conducted, EL is Emotional Labor, determined by sentiment analysis tools that automatically evaluate an emotional tone and stress levels in interactions of the agent, RT is Repetitive Tasks, evaluated by analyzing task logs to identify and count frequency of repetitive tasks performed by the agent, LA is Lack of Autonomy, is a measure of control the agent has over work and decision-making processes, PP is Performance Pressure, which is measured by automatically comparing performance targets with performance metrics of the agent to identify deviations that indicate pressure, IA is Inadequate Training, evaluated by analyzing training completion rates and correlating them with performance data of the agent to identify gaps in training effectiveness, PE is Physical Environment, which measures level of impact of workspace conditions on agents' comfort and performance, and IB is Inadequate Breaks, monitored by tracking agents' break times and durations automatically through time-keeping systems and identifying patterns of inadequate breaks.

T1 is total time for which agent was available.

T2 is the time for which agent is expected to be available.

t is a variable of integration, which represents total time period for which burnout score is to be calculated, and s is an average value of T1 and T2.

According to some embodiments of the present disclosure, the high call volume refers to a situation where a contact center receives a significantly larger number of incoming calls than usual within a specified period. It's a critical factor to consider when calculating agent-burnout scores for contact center agents because it directly impacts their workload and stress levels. By factoring in high call volume when calculating agent burnout scores, a system, such as system 100A in FIG. 1A and such as system 100B in FIG. 1B may accurately gauge the intensity of workload pressure on agents and identify individuals who may be at heightened risk of burnout.

According to some embodiments of the present disclosure, in the implementation of High Call Volume there may be two functions. 'fetch_todays_data_from_database' and 'calculate_high_call_volume'. The first function retrieves today's data from the agent database, such as agent database 140*b* and returning the total number of incoming calls. The second function may determine whether the incoming call volume is considered high based on a predetermined threshold value, initializes variables for the agent's ID and today's date, then fetches today's data from the database. Next, it defines a threshold value for high call volume. Then, it may calculate whether the incoming call volume is high and provides the result accordingly.

According to some embodiments of the present disclosure, emotional labor may refer to the effort and energy the agent may expend in managing the emotions and displaying specific emotional states as part of the job role. This may involve regulating emotions to meet organizational expectations or customer needs, such as maintaining a positive demeanor, showing empathy, or managing frustration, even in challenging interactions. The impact of emotional labor on agent-burnout scores, is in its contribution to emotional exhaustion, role conflict, and job dissatisfaction, factors that intensify burnout among contact center agents, underscoring the necessity of assessing and addressing emotional labor in burnout prevention strategies.

According to some embodiments of the present disclosure, repetitive tasks parameter relates to the agents being frequently tasked with repetitive duties that can take a toll on their well-being and contribute to burnout. These tasks encompass a range of activities, including handling routine inquiries, adhering to standardized scripts, and performing data entry. Following predefined procedures may limit agents' ability to exercise creativity and engagement, as they navigate through familiar scenarios day in and day out. Additionally, the repetitive nature of problem-solving and the constant need to address customer complaints and disputes can lead to emotional strain and exhaustion.

According to some embodiments of the present disclosure, the lack of autonomy parameter indicates the absence of autonomy in contact center roles which can exacerbate agent burnout due to various factors. Agents constrained by rigid policies and scripts feel disempowered, leading to frustration and inefficiency in addressing customer needs. Inflexible work environments with little control over schedules and assignments contribute to monotony and emotional exhaustion. Micromanagement and constant surveillance create stress and pressure, eroding trust, and motivation. Limited growth opportunities and a lack of ownership over tasks further diminish job satisfaction and engagement.

According to some embodiments of the present disclosure, the performance pressure parameter amplifies agent burnout by escalating stress levels, increasing workloads, and fostering a culture of micromanagement. Agents face heightened anxiety over meeting demanding metrics and fear repercussions for underperformance, leading to decreased morale and job satisfaction. The relentless pursuit of targets takes a toll on mental and emotional well-being, resulting in exhaustion and cynicism. This toxic environment contributes to high turnover rates and reduced productivity.

According to some embodiments of the present disclosure, the inadequate training parameter relates to inadequate training which exacerbates agent burnout by leaving agents ill-equipped to handle job demands effectively. Without proper training, agents struggle to navigate complex systems, resolve issues efficiently, and meet customer expectations. This leads to heightened stress, frustration, and a sense of incompetence. Agents may experience anxiety over making mistakes or being unable to assist customers, eroding confidence, and job satisfaction. Moreover, the lack of skills development and career growth opportunities fosters feelings of stagnation and disillusionment.

According to some embodiments of the present disclosure, the physical environment parameter and inadequate breaks parameter relate to the physical environment and inadequate breaks which significantly impact burnout among agents. Uncomfortable workspaces, excessive noise, and poor ergonomics contribute to physical discomfort and fatigue, exacerbating stress levels. Without sufficient breaks, agents experience prolonged periods of intense focus without relief, leading to mental exhaustion and decreased productivity. Additionally, lack of downtime prevents agents from engaging in activities that promote relaxation and stress reduction, further contributing to burnout.

According to some embodiments of the present disclosure, the parameters may be normalized for scaling by feature scaling techniques, such as min-max scaling or standardization to ensure all variables are on a similar scale. The normalization of the parameters may utilize libraries like scikit-learn in Python. Data distribution may be monitored before and after the normalization to ensure effectiveness.

According to some embodiments of the present disclosure, the agent-burnout index may be calculated at specified time-intervals and its value may be from 1 to 10. A push-notification 360 with the details of the agent-burnout index may be displayed via a UI that may be associated to an application, such as a Workforce Management (WFM) application 150 in FIG. 1A that is running on a computerized-device of the user 160 in FIG. 1A. For example, UI 2200 in FIG. 22. The UI may be a supervisor and manager UI 365.

According to some embodiments of the present disclosure, the burnout transition monitor 330 may track shifts between low and high agent-burnout indices over time, the burnout transition monitor 330, such as burnout transition monitor 195*c* in FIG. 1C, may define thresholds for identifying transitions between low and high agent-burnout indices and may utilize statistical techniques, such as trend analysis to detect patterns in agent-burnout index transitions.

According to some embodiments of the present disclosure, the calculated agent-burnout score may be categorized by burnout score categorization 320. For example, as shown in FIG. 6. Then, the burnout-detection module 300 may fetch agent history from database 325 for insights, by operating database queries to retrieve historical data for each agent. It has data structures to organize and store agent history efficiently. Caching mechanisms may be implemented to optimize data retrieval performance.

According to some embodiments of the present disclosure, the remedy generation 335 may be operated by the remedy recommender which may suggest interventions based on historical data and transition monitoring. Algorithms to analyze historical data and identify patterns associated with effective interventions may be operated. Machine Learning (ML) techniques may be utilized, such as collaborative filtering or decision trees for recommendation. A UI may be implemented to present recommended interventions, such as PTO scheduler 340, training scheduler 345 and break scheduler 350.

According to some embodiments of the present disclosure, checking if agent-burnout has abated 378. If burnout persists, the process may be repeated for the agent. Implement a loop structure to continuously monitor and assess burnout levels for each agent. Criteria may be defined for determining when to reevaluate an agent's burnout status. Ensures Seamless Integration with Other Components of the System for Ongoing Monitoring.

According to some embodiments of the present disclosure, performance index calculator 370 may factor in burnout index, quality scores, and customer satisfaction. Testing may be conducted to validate the effectiveness and reliability of the performance index calculation. The performance index may be stored in a database, database update and data publishing 375.

According to some embodiments of the present disclosure, the burnout score, e.g., agent-burnout index may be forwarded to a QM application 380 and leadership dashboard 385, these burnout scores contain scores of individual agents as well as the consolidated burnout scores and root cause of the entire teams to the leadership and quality management applications. Workforce Management may have secure access controls to ensure that only authorized stakeholders can view burnout scores, root causes and burnout pattern.

According to some embodiments of the present disclosure, providing detailed documentation and training on how to interpret and utilize burnout scores, root causes and burnout pattern effectively. These scores, patterns, and causes of burnout will provide leadership with valuable insights for making decisions regarding attrition rates, targeted talent recruitment, and employee satisfaction programs. For example, if burnout during certain timeframes leads to higher attrition rates, leadership can recruit new agents with specific skill sets suited to the demanding domains.

FIG. 4 is a high-level workflow of agent-burnout index calculator module 400, in accordance with some embodiments of the present disclosure.

According to some embodiments of the present disclosure, formula I includes the following constants, T1, T2, t and s. T1 is a total time that the agent was available. T2 is a total time that the agent is expected to be available. t is a duration period for a calculation of the burnout score and s is an average of T1 and T2.

These constants may be estimated as follows:

According to some embodiments of the present disclosure, operating empirical data fitting by minimizing the gap between actual data and the results by curve fitting techniques and optimization algorithms. Sensitivity analysis may be operated by varying T1 and T2 and analyzing the impact on results. Then, operating adaptation and iteration by choosing initial values of T1 and T2 and comparing results with actual data and change parameters. Following the process over the iteration to get fined tuned results. These values may be entered once in the formula rather than estimating it.

According to some embodiments of the present disclosure, the agent-burnout index calculator module 400 may operate data loading 410 by retrieving the data needed for agent-burnout score calculation. This data may include information such as work logs, performance metrics, and survey responses from contact center agents. The agent-burnout index calculator module 400 may retrieve this data from a specified source, such as a database or data warehouse, and prepares it for further processing.

According to some embodiments of the present disclosure, the agent-burnout index calculator module 400 may operate feature extraction 420 by selecting and transforming raw data into a format suitable for analysis. Key features or variables that may contribute to burnout, such as workload intensity, work hours, and stress levels may be identified. The module 400 may extract these features from the raw data and may prepare them for normalization and scoring.

According to some embodiments of the present disclosure, normalization 430 may be operated to scale the values of features to a consistent range. This ensures that features with larger magnitudes do not dominate those with smaller magnitudes during scoring. Common normalization techniques include Min-Max scaling and Z-score normalization. The module 400 may apply these techniques to the extracted features, to ensure that they are on a comparable scale for accurate scoring.

According to some embodiments of the present disclosure, the agent-burnout index calculator module 400 may operate score calculation 440 by calculating the agent-burnout score based on the normalized features. This may involve applying a predefined mathematical formula or algorithm that combines the normalized features to produce a single numerical score representing the level of burnout experienced by an agent. The module 400 may execute this calculation and may generate the agent-burnout score, which can then be used for further analysis or decision-making within the contact center environment.

FIG. 5 is a high-level workflow of agent-burnout index calculation 500, in accordance with some embodiments of the present disclosure;

According to some embodiments of the present disclosure, the agent-burnout index calculation 500 may define variables and constraints 510. For example, the parameters of formula I and time constants T1, T2. Then, calculate Max value 520 as the maximum value among the parameters of formula I. Calculate normalization factor 530 as max_value/10 and perform integration using quad 540. Quad is a library in Python which is used to perform integration operation.

According to some embodiments of the present disclosure, the integration using quad 540 may be performed for example by defining:

$$\text{integrand(s) as } (hv + el + rt + la + pp + it + pe + ib) *$$

$$np \cdot \exp\left(-(\text{time}-s)/T1\right) * np \cdot \exp\left(-s/T2\right).$$

Perform numerical integration using quad from scipy, for numerical integration in Python.
Integrate integrand from 0 to time.
Normalize the result by dividing by time.
Define time_point_week as 7.
Calculate the agent-burnout score 550 by.
Call calculate_burnout_score function with the parameters of formula I hv_normalized, el_normalized, rt_normalized, la_normalized, pp_normalized, it_normalized, pe_normalized, ib_normalized. T1, T2, time_point_week.

FIG. 6 is a graph of agent-burnout index categorization 600, in accordance with some embodiments of the present disclosure;

According to some embodiments of the present disclosure, class one in the graph 600 may correspond to burnout scores ranging from 1 to 1.99. It may represent the baseline level, indicating minimal or no burnout. agents in this category typically exhibit no significant signs of stress-related exhaustion or emotional fatigue. It serves as a reference point for assessing higher levels of burnout.

According to some embodiments of the present disclosure, class 2-4 in the graph 600 may correspond to burnout scores ranging from 2 to 4.99. It may represent a range associated with usual stress levels. agents in this class may experience occasional stressors and challenges in their work environment but can generally manage them without significant adverse effects on their well-being.

According to some embodiments of the present disclosure, class 5-7 in the graph 600 may correspond to burnout scores ranging from 5 to 7.99, indicating a moderate level of burnout. Agents in this category may experience a notable increase in stress levels, leading to feelings of fatigue, frustration, and decreased motivation. While manageable, these stress levels may begin to impact job performance and overall quality of life.

According to some embodiments of the present disclosure, class 5-7 in the graph 600 may correspond to burnout scores ranging from 8 to 9.99 fall into this category, reflecting a high level of burnout. Agents in this class are likely experiencing significant stressors that have begun to significantly impact their physical and mental well-being. Intervention and support measures may be necessary to prevent further escalation of burnout symptoms.

According to some embodiments of the present disclosure, class 10 in the graph 600 may represent the highest level of burnout and indicates severe stress. Agents in this category are likely experiencing overwhelming levels of stress, leading to extreme exhaustion, emotional depletion, and a diminished capacity to cope with daily demands. Urgent intervention and comprehensive support are essential to address the root causes and mitigate the adverse effects of burnout.

Figure 7:
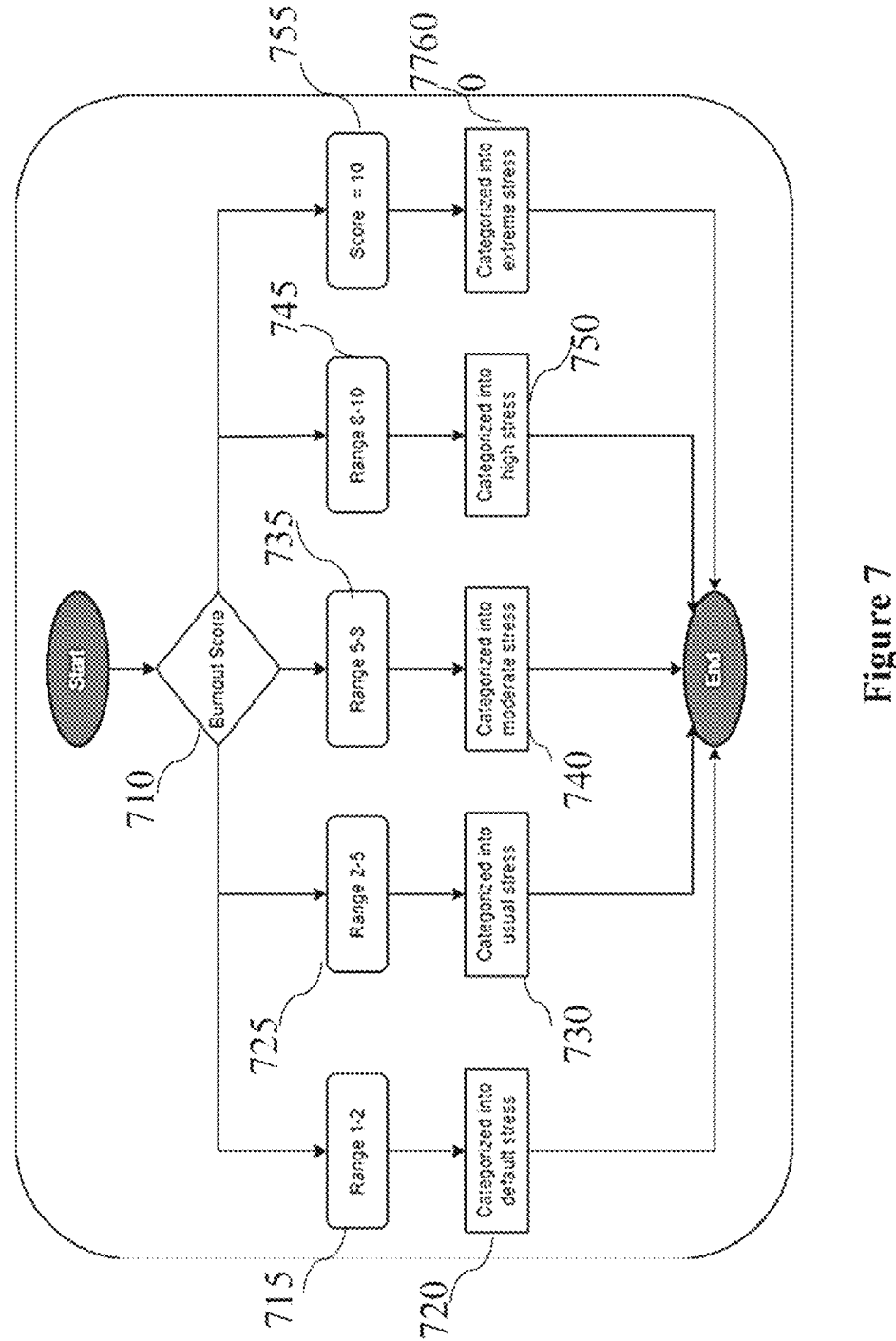
FIG. 7 is a high-level workflow of agent-burnout index categorization, in accordance with some embodiments of the present disclosure.

FIG. 7 is a high-level workflow 700 of agent-burnout index categorization, in accordance with some embodiments of the present disclosure;

According to some embodiments of the present disclosure, the burnout score 710 of an agent may be checked. When the burnout score is in the range 1-2 715, then the score may be categorized into default stress 720.

According to some embodiments of the present disclosure, when the burnout score is in the range 2-5 725, then the score may be categorized into usual stress 730, e.g., moderate stress levels.

According to some embodiments of the present disclosure, when the burnout score is in the range 5-8 735, then the score may be categorized into moderate stress 740, e.g., moderate stress levels, e.g., significant but manageable stress.

According to some embodiments of the present disclosure, when the burnout score is in the range 8-10 745, then the score may be categorized into high stress 750, e.g., elevated stress levels requiring attention.

According to some embodiments of the present disclosure, when the burnout score equals 10 755, then the score may be categorized into severe stress 760, e.g., critical need for intervention and support.

According to some embodiments of the present disclosure, when none of the conditions are met, e.g., when the burnout score does not fall into any of the specified ranges, it returns "Invalid burnout score".

According to some embodiments of the present disclosure,

FIG. 8 is a high-level workflow of root cause analysis 800, in accordance with some embodiments of the present disclosure;

According to some embodiments of the present disclosure, load dataset 810, the dataset is may be stored in a structured format such as a Comma Separated Values (CSV) file or a database. Libraries like Pandas in Python are commonly used to load the dataset into memory as a DataFrame. The DataFrame may contain rows representing individual instances, e.g., data points and columns representing features, e.g., parameters and the target variable, e.g., agent-burnout score.

According to some embodiments of the present disclosure, split into feature and target 820 may be operated by selecting the features, i.e., independent variables based on their relevance to predicting the target variable, agent-burnout score. The target variable, i.e., dependent variable may be identified as the one predicted by the model. The features may be assigned to the variable X and the target variable to the variable y.

According to some embodiments of the present disclosure, train Random Forest Regressor 830 may be a machine learning algorithm used for regression tasks, where the target variable is continuous. The algorithm works by constructing multiple decision trees during training and outputting the average prediction of the individual trees. Parameters, such as the number of trees, n_estimators and maximum depth of the trees, max_depth, are specified during the ML model training.

According to some embodiments of the present disclosure, feature importance analysis 835 of the parameters in formula I may be operated after training the Random Forest Regressor model. The feature importance analysis 835 may be performed to determine the relative importance of each input feature in predicting the burnout score. Feature importance is calculated based on the decrease in node impurity, e.g., Gini impurity, brought by each feature across all trees in the random forest. Higher feature importance scores indicate that the feature has a greater impact on predicting the target variable.

According to some embodiments of the present disclosure, top contributing factor identification 840 to burnout may be identified based on the feature importance analysis results. Features, e.g., parameters in formula I, with the highest importance scores may be considered the most influential in predicting the burnout score. These top contributing factors may provide insights into which aspects of the agent's work environment or behavior are most strongly associated with burnout.

According to some embodiments of the present disclosure, the score importance and top features may be stored in agent database 850. The calculated score importance, e.g., feature importance scores and the top contributing features may be saved to the agent database 850 for further analysis and decision-making. This may allow to track and monitor the factors contributing to burnout over time and take proactive measures to address them. The agent database may be updated periodically as new data becomes available or as the model is retrained with additional data.

According to some embodiments of the present disclosure, Random Forest for Regression is a versatile machine learning algorithm known for its robustness and ability to handle both classification and regression tasks effectively. Random Forest for Regression works by constructing multiple decision trees during training and outputs the average prediction, for regression, of the individual trees. This ensemble approach often leads to improved predictive performance and generalization.

According to some embodiments of the present disclosure, the burnout calculation may be influenced by non-linear relationships and complex interactions among various factors, e.g., parameters. Random Forest for Regression can capture such non-linearities and interactions effectively, making it suitable for modeling the complex nature of burnout.

According to some embodiments of the present disclosure, Random Forest provides a built-in feature importance metric, for feature importance analysis, which allows us to assess the relative importance of each input feature, parameter in predicting the target variable, agent-burnout score. This feature is particularly useful for identifying the key contributing factors to burnout.

According to some embodiments of the present disclosure, Random Forest is less prone to overfitting compared to individual decision trees, thanks to techniques like boot-strapping and random feature selection. This helps ensure that the model generalizes well to unseen data and minimizes the risk of capturing noise or spurious patterns in the dataset. The Random Forest algorithm was chosen for its ability to handle non-linearity, capture complex relationships, provide feature importance analysis, and maintain robustness to overfitting, making it a suitable choice for predicting burnout in this context.

According to some embodiments of the present disclosure, Proof of Concept (POC) for root cause analyzer has been performed. The technology used is python 3.8, programming language, Jupyter notebook code editor and environment to execute Machine Learning scripts. Pandas which is a powerful Python library for data manipulation and analysis, providing data structures and functions with to work structured data efficiently, sklearn.model_selection. train_test_split: A function from scikit-learn library used to split datasets into random train and test subsets, facilitating model evaluation and validation, sklearn.ensemble.RandomForestRegressor: RandomForestRegressor is a regression algorithm from scikit-learn's ensemble module, implementing a random forest algorithm for regression tasks by constructing multiple decision trees during training. matplotlib.pyplot: Matplotlib.pyplot is a plotting module in the Matplotlib library, providing a MATLAB-like interface for creating static, interactive, and animated visualizations in Python. NumPy is a fundamental package for scientific computing in Python, providing support for multi-dimensional arrays, mathematical functions, linear algebra, and random number generation.

FIG. 9 is a graph 900 of agent-burnout index contribution by feature, in accordance with some embodiments of the present disclosure;

According to some embodiments of the present disclosure, feature importance scores represent each feature's contribution to the model's predictive performance. Higher importance scores indicate that the feature plays a more significant role in predicting the target variable. Feature importance scores may be calculated based on the decrease in node impurity, e.g., Gini impurity, brought by each feature across all trees in the random forest. Features that result in larger decreases in impurity when used in decision trees are assigned higher importance scores.

According to some embodiments of the present disclosure, feature importance scores are often visualized using bar plots. Each bar in the plot represents the importance score of a specific feature, with taller bars indicating higher importance.

According to some embodiments of the present disclosure, feature importance scores help identify which input features have the most influence on the target variable. This information is valuable for understanding the factors that contribute most significantly to burnout and can guide decision-making in burnout prevention and management strategies.

According to some embodiments of the present disclosure, the top contributing factors to burnout may be identified by sorting the feature importance scores in descending order and selecting the top three features. These top contributing factors provide insights into which aspects of the agent's work environment or behavior have the greatest impact on burnout.

According to some embodiments of the present disclosure, the performance impact calculator module may be a tool designed to assess the overall impact of various factors on an individual's performance within a contact center environment. It considers several key metrics, including burnout score, CSAT score, quality scores, and KPIs, to provide a full evaluation of an agent's performance. The output of the performance impact calculator module is a performance impact score, which provides valuable insights into an agent's performance relative to key performance metrics and organizational goals. This score then can be utilized by other applications such as QM application to create quality plans.

FIG. 10 is a high-level workflow of performance impact score calculation 1000, in accordance with some embodiments of the present disclosure;

According to some embodiments of the present disclosure, assign input values and weights 1010.

According to some embodiments of the present disclosure, the calculate_performance_impact_score function takes several parameters: burnout_score, csat_score, quality_score, kpi_score, and weights (w_bs, w_csat, w_qs, w_kpi). It calculates the performance impact score based on these inputs.

According to some embodiments of the present disclosure, calculate numerator and denominator 1020 by the numerator calculated by multiplying the burnout_score by its respective weight (w_bs). The denominator calculated using a formula that combines weighted scores for csat_score^2, sqrt (quality_score), and kpi_score.

According to some embodiments of the present disclosure, checking if division is by zero 1030. It checks if the denominator is zero. If the denominator is zero, it returns infinity to handle the division by zero case, return invalid scores 1040.

According to some embodiments of the present disclosure, calculate performance impact score 1050, which is the result of dividing the numerator by the denominator. The performance impact score may be saved in the agent database 1070.

FIG. 11 is a high-level workflow of burnout transition monitor module 1100, in accordance with some embodiments of the present disclosure;

According to some embodiments of the present disclosure, the burnout transition monitor module 1100, such as burnout transition monitor module 195c in FIG. 1C, may track the frequency of shifts and update the agents database, such as agents database 140 in FIG. 1A. The burnout transition monitor module 1100 may provide an analysis of the agent's work patterns, enabling organizations to effectively manage and mitigate the risks of burnout among their workforces.

According to some embodiments of the present disclosure, by understanding the workload distribution and identifying areas of concern, managers can take timely actions, such as workload adjustments, scheduling optimizations, or providing additional support to prevent burnout and maintain agent well-being.

According to some embodiments of the present disclosure, the burnout transition monitor module 1100 may implement Autoregressive Integrated Moving Average (ARIMA) algorithm. The ARIMA model produces interpretable results, making it easy to understand the underlying patterns and dynamics in the data. Also, the ARIMA algorithm provides flexibility as it may capture a wide range of temporal patterns, including trend, seasonality, and autocorrelation. This flexibility allows the model to adapt to various types of time series data, making it suitable for analyzing agent transition patterns that may exhibit complex temporal dynamics.

According to some embodiments of the present disclosure, moreover, the ARIMA algorithm has no dependency on external factors. Unlike some machine learning algorithms that require a large amount of labeled data or external features, ARIMA relies solely on historical time series data. This means that you can start building the model even with limited data availability, focusing on capturing the inherent patterns in the agent transition data. ARIMA is known for its robustness in handling noisy and irregularly sampled time series data. It effectively handles missing values and outliers, which are common challenges in real-world datasets.

According to some embodiments of the present disclosure, the burnout transition monitor module 1100 may generate a synthetic work schedule 1110 by creating synthetic data to represent a single agent's work schedule for a specified period, such as a month. The work schedule may include information such as the date, start time, end time, and any breaks or intervals. Synthetic data generation may involve randomization or modeling based on historical patterns or assumptions about typical work schedules.

According to some embodiments of the present disclosure, the burnout transition monitor module 1100 may simulate transitions 1120. Transitions between different work states, e.g., working, and non-working are simulated based on predefined probabilities. For example, transitions may occur between states such as working on a break, in a meeting, or off-duty. The probability of transition at each time interval may be determined based on factors such as historical data or domain knowledge.

According to some embodiments of the present disclosure, the burnout transition monitor module 1100 may create data dataframe 1130. The simulated work schedule and transitions are organized and stored in a dataframe, which is a tabular data structure commonly used in data analysis and manipulation. Each row of the dataframe typically represents a specific time interval, e.g., hour or day, and columns represent different attributes or features of the data, e.g., date, time, work state.

According to some embodiments of the present disclosure, the burnout transition monitor module 1100 may resample data to daily intervals 1140. The dataframe may be resampled to aggregate the data into daily intervals, which may simplify the analysis by focusing on daily trends and patterns in the work schedule and transitions. The resampling may involve grouping the data by day and aggregating statistics, such as counts or sums.

According to some embodiments of the present disclosure, the burnout transition monitor module 1100 may calculate daily transitions and transition insights 1150. The number of transitions for each day is calculated based on the resampled data. Transitions may be categorized into different types, e.g., transitions from working to non-working to analyze specific aspects of the work schedule.

According to some embodiments of the present disclosure, the additional insights may be calculated to provide further context and understanding of the burnout patterns. These insights may include metrics, such as the number of days with the highest burnout score, the variance of the burnout index, the date of the highest burnout index, and the highest burnout index itself.

According to some embodiments of the present disclosure, the burnout patterns for the month, along with the calculated insights, may be used for further analysis or visualization. The burnout patterns for the month, along with the calculated insights, may be presented in various formats, such as tables, charts, or reports, to communicate the findings effectively to stakeholders or decision-makers.

FIG. 12 is a screenshot of a User Interface (UI) associate to a Quality Management (QM) application, in accordance with some embodiments of the present disclosure.

According to some embodiments of the present disclosure, the QM application may filter interactions for evaluation based on root cause factors of burnout. For example, the QM application may be configured via UI 1230 of the QM application to filter interactions based on the agent-burnout index such that the QM application may operate distribution of interactions based on agent burnout score 1240 by allocating recorded calls for evaluation for interactions of agents that their agent-burnout index ranges from 2 to 4 or an automatically selected range.

According to some embodiments of the present disclosure, the agent-burnout index may be used as a data point for evaluators to investigate the root causes of agent performance issues, gaps in knowledge, inefficient processes, or other factors contributing to agent burnout.

According to some embodiments of the present disclosure, the remedy recommender 1210, such as remedy recommender 185c in FIG. 1C may forward the agent-burnout index of the agent to a remedy selector auto-enforce 1220 for an automated scheduling a corrective action to the agent.

FIG. 13 is a high-level workflow 1300 of automatic break and leave schedules, in accordance with some embodiments of the present disclosure.

According to some embodiments of the present disclosure, the burnout transition monitor 1305, such as burnout transition monitor 195c in FIG. 1C may operate as the data source for the remedy recommender 1320, such as remedy recommender 185c in FIG. 1C. The remedy selector auto-enforce 1320 may operate a break for a predetermined period of time in a schedule of the agent via the WFM application.

According to some embodiments of the present disclosure, the corrective action may be automatically scheduling a break for a predetermined period of time in a schedule of the agent via the WFM application 150 in FIG. 1A, WFM mandatory break 1330. For example, as shown in UI 1900 in FIG. 19.

According to some embodiments of the present disclosure, these enforced breaks can vary from a one-hour respite to a full day of mandatory paid leave, designed to alleviate stress. In a contact center, leveraging the burnout score can enhance workforce management strategies by implementing mandatory work breaks based on predefined thresholds. For example, if an agent's burnout score exceeds a certain level, the system can automatically schedule short breaks or days off. This proactive approach may help in maintaining optimal agent health and productivity, reducing turnover, and improving overall service quality. Such mechanisms can be integrated into the contact center's existing WFM application, ensuring a seamless operational flow and adherence to occupational health guidelines.

FIG. 14 is a high-level workflow 1400 of shift adjustments and automatic coaching package allocations, in accordance with some embodiments of the present disclosure.

According to some embodiments of the present disclosure, the burnout-transition monitor module 1410 may be operated to continuously check the agent-burnout index of each agent in the agents-database, and the corrective action for the identified root cause factors may be determined when the calculated agent-burnout index is above a preconfigured burnout-threshold by operating the remedy-recommender module 1420.

According to some embodiments of the present disclosure, based on the results of the remedy recommender 1420, the remedy selector auto-enforce 1430 may automatically schedule a coaching and training assignments 1435 based on the agent burnout scores. Then, the agents may be notified as to the scheduled coaching assignments. These coaching assignments may be tailored to address varying levels of stress and may be aimed at skill enhancement and well-being improvement.

According to some embodiments of the present disclosure, in contact centers, the utilization of agent burnout scores to assign appropriate coaching assignments can effectively support agent development and stress management. This assignment may be operated based on detected specific thresholds in an agent's burnout score that indicate the need for intervention.

According to some embodiments of the present disclosure, analytics may be used to monitor and calculate agent burnout scores based on agents' performance metrics and emotional indicators. Based on these scores, a range of coaching programs may be configured, addressing various levels of stress and skill needs. This setup may be integrated with the coaching system to automate the enrollment process when agents reach certain burnout score thresholds. An automated trigger mechanism within the system initiates coaching assignments, ensuring timely intervention. Agents and their supervisors may receive notifications about these coaching assignments, facilitating seamless enrollment and participation.

According to some embodiments of the present disclosure, after the agent may complete the coaching, feedback may be collected from the agent to refine the burnout scoring system and to enhance the coaching content, ensuring that it remains effective and relevant. Finally, reporting tools within the Learning Management System (LMS) track the participation and effectiveness of these interventions, providing valuable insights for continuous improvement in managing agent well-being and performance.

According to some embodiments of the present disclosure, the automated shift adjustments recommendations 1440 may receive the recommendation to perform shift adjustments for the given agent to help reduce burnout from the remedy selector auto-enforce 1430 and update schedule in WFM application 1450 for an agent.

FIG. 15A is a high-level workflow 1500 of call routing decisions based on agent-burnout index, in accordance with some embodiments of the present disclosure;

According to some embodiments of the present disclosure, in contact centers, the ACD 1530 system may dynamically route incoming calls to agents based on their current agent burnout scores. Agents with lower burnout scores, indicating they are less stressed and more engaged, may be assigned more calls or potentially more complex queries from customers. Conversely, those with higher agent burnout scores receive fewer calls or are given simpler tasks to help manage their stress levels and prevent further burnout.

According to some embodiments of the present disclosure, the WFM tools are integral to this routing process as they update the staffing needs based on agent burnout scores 1525 which is real-time data about agent burnout levels. The WFM tools ensure that there are enough agents with lower burnout scores available during peak hours to handle the increased call volume. This might involve scheduling more agents who are fresher and less burnt out during these times. Additionally, the WFM tools may recommend optimal break schedules and shift adjustments to help manage and reduce overall burnout levels.

According to some embodiments of the present disclosure, this strategic routing and staffing adjustment based on burnout scores may not only contribute to evenly distribute the workload among agents but also contributes to a healthier work environment. Routing based on agent burnout index may maximize operational efficiency by aligning agent availability with their current capacity to handle work, thus improving both customer service quality and agent morale. By maintaining a balance in the workload and providing necessary breaks and shifts adjustments, contact centers may enhance their service delivery and reduce the turnover rates associated with burnout.

According to some embodiments of the present disclosure, FIG. 15B illustrates a system designed to manage agent burnout in a contact center by integrating Agent Burnout Scores, Workforce Management (WFM), and Automatic Call Distributor (ACD) systems. Agent burnout scores may be assessed and fed into both the WFM and ACD systems. The WFM adjusts schedules and the number of impacted agent groups based on burnout scores and records data on specific dates, indicating the number of schedules and agent groups affected. The ACD utilizes burnout scores to implement actions such as reallocating agents and logs details of each call, including date, call ID, skills required, impact reason, e.g., high burnout score, and the actions taken, e.g., getting agents for reallocation. This coordinated process ensures that agents with high burnout scores are identified, and appropriate measures such as schedule adjustments and agent reallocation are taken to mitigate burnout risks.

FIG. 16 is a high-level workflow of prompt generation 1600, in accordance with some embodiments of the present disclosure.

According to some embodiments of the present disclosure, the operating of the remedy-recommender module, such as remedy recommender 185c in FIG. 1C, may include constructing a prompt based on a provided template-text. The template-text may include the agent-burnout index, the identified root-cause factors, and a number of remedies in the corrective action. The workflow involves generating a template-text that includes agent-burnout index, root-cause factors to create a detailed prompt for the Generative AI model. This model uses the prompt to generate corrective actions, which then may be analyzed by an NLP model to extract specific remedies. The current remedies associated with the agent may be fetched from the agent database for comparison to ensure the new recommendations are unique. If there is overlap, the process iteratively refines the prompt until effective remedies are identified. Finally, the validated corrective action may be recorded in the agent database for future implementation and reference.

According to some embodiments of the present disclosure, input selection 1610 may be operated at the beginning of the prompt generation process, the user may provide initial input or context for the prompt. This could be a question, a statement, or a specific task requirement.

According to some embodiments of the present disclosure, context analysis 1620 may be operated by analyzing the input provided by the user to extract key information such as the topic, tone, and level of formality required for the prompt. Techniques such as Natural Language Processing (NLP) may be used to parse and understand the input context.

According to some embodiments of the present disclosure, prompt formulation 1630 may be operated based on the context analysis and a preliminary prompt structure may be generated. The length, complexity, and style of the prompt may be determined and factors, such as the desired response type, e.g., informative, creative, argumentative may be considered.

According to some embodiments of the present disclosure, language model interaction 1640 may use the formulated prompt structure to interact with the Gen AI with LLM, e.g., GPT. Candidate prompts may be generated by providing the formulated structure as input to the language model and retrieving the generated text.

According to some embodiments of the present disclosure, the generated prompts may be evaluated based on predefined criteria such as coherence, relevance, and informativeness. Techniques such as automatic scoring or human judgment, e.g., context adjustment 1660 may be used to assess the quality of the generated prompts.

According to some embodiments of the present disclosure, a feedback loop may be operated based on the evaluation results by iterating on the prompt generation process. If the generated prompts do not meet the desired criteria, adjustments are made to the input context, prompt formulation, or interaction with the language model, and the process is repeated.

According to some embodiments of the present disclosure, the best performing prompts may be selected based on the evaluation results. The selected prompt(s) may be presented to the user for further action, such as generating content, completing a task, or refining the prompt.

According to some embodiments of the present disclosure, for example, using Gen AI, such as open AI and defining a function:

(def generate_remedies (root_causes, burnout_patterns, num_remedies=3):): This block defines a function named generate_remedies that takes three parameters: root_causes, burnout_patterns, and an optional parameter num_remedies, which defaults to 3 if not provided.

According to some embodiments of the present disclosure, defining a prompt string that will be used to generate remedies. The prompt includes information about the burnout index of a hypothetical agent named Andrew, along with his scores and root cause of burnout.

According to some embodiments of the present disclosure, starting a loop that will iterate num_remedies times, generating remedies for each iteration and then appending the generated remedy, extracted from the API response, to the generated_remedies list after stripping any leading or trailing whitespace.

According to some embodiments of the present disclosure, after generating all remedies, a list of generated remedies may be returned. For the example, hardcoded values have been provided for the root-cause factors and burnout_ patterns for demonstration purposes instead of dynamically providing based on actual data.

According to some embodiments of the present disclosure, the results of the example may be:

"Based on your burnout patterns and root cause factors:

Burnout Pattern: High call volume for 10 days.

Assign a particular training to improve efficiency in handling high call volumes.

Root Cause: Stringent shift timing for a week

Schedule paid time off to rest and rejuvenate, ensuring a healthy work-life balance."

FIG. 17 is a high-level workflow of correction action operation 1700, in accordance with some embodiments of the present disclosure.

According to some embodiments of the present disclosure, a Paid Time Off (PTO) scheduler may automate the process of scheduling paid time off for agents. It may be integrated with the calendar system to allocate approved time off, ensuring seamless management of agent schedules while providing necessary breaks to mitigate burnout.

According to some embodiments of the present disclosure, a break scheduler may automate the scheduling of breaks for agents. It may configure periodic breaks within the agent's work schedule, promoting healthy work habits and preventing burnout by ensuring agents take regular, designated breaks to rest and recharge.

According to some embodiments of the present disclosure, a training scheduler may automate the scheduling of training sessions for agents. It may be integrated with training platforms to schedule and manage training sessions, ensuring agents receive the necessary skills and knowledge to address burnout factors effectively through targeted training interventions.

According to some embodiments of the present disclosure, the remedy recommender module generates a list of potential remedies based on the burnout status of the agent. These remedies could include options such as training sessions, PTO, or enforced breaks.

According to some embodiments of the present disclosure, correction action operation 1700 may start by fetching generated remedies from the agent database 1710 and then check if remedies are available 1720 for selection.

According to some embodiments of the present disclosure, when there are remedies for selection, a user may select a remedy 1725 from a list of remedies. For example, choosing to schedule training, PTO, or a break for the burnt-out agent.

According to some embodiments of the present disclosure, when the selected remedy is training, adding training session 1735 then scheduling a training session in the calendar of the agent to ensure that the agent receives the necessary training to address burnout factors effectively.

According to some embodiments of the present disclosure, a user, such as a supervisor may be notified 1745 after scheduling the training session to confirm the schedule and inform them about the upcoming training session for the agent.

According to some embodiments of the present disclosure, when the selected remedy is PTO, schedule PTO 1730 then scheduling paid time off in the calendar of the agent to allow the agent to take a break from work and recharge to alleviate burnout.

According to some embodiments of the present disclosure, a user, such as a supervisor may be notified 1745 after scheduling the PTO to confirm the schedule and inform about the approved time off for the agent.

According to some embodiments of the present disclosure, when the selected remedy is enforcing a break 1740, then scheduling a break period in the calendar of the agent to ensure that the agent takes regular breaks to manage stress and prevent burnout.

According to some embodiments of the present disclosure, a user, such as a supervisor may be notified 1745 after enforcing the break, may be notified to confirm the schedule and inform them about the scheduled break periods for the agent.

FIG. 18 is a screenshot of UI 1800 displaying remedies, in accordance with some embodiments of the present disclosure.

According to some embodiments of the present disclosure, the remedies suggested by the remedy recommender may be displayed via a UI. Out of these generated remedies, a user may select most appropriate remedy according to the agent's historical and current performance. Along with the remedies, the manager can see the entire month's report of a selected agent. After selection of appropriate remedy which is either assign specific training module or rotate stressful shift timings, the agent may change the course of action accordingly. If auto-enforce is selected, then best suitable remedy may be automatically selected.

FIG. 19 is a screenshot of UI 1900 showing a break is forced in the schedule of the agent, in accordance with some embodiments of the present disclosure.

According to some embodiments of the present disclosure, UI 1900 may be presented to an agent that has been enforced a break as a remedy for the calculated agent-burnout index. This break can range from 1 hour to one day mandatory paid time off to relieve the stress.

FIG. 20 is a screenshot of an agent's schedule 2000, in accordance with some embodiments of the present disclosure.

According to some embodiments of the present disclosure, agent's schedule 2000 may include the scheduled remedies, such as training for effective call, time-off due to burnout and mandatory paid time-off.

FIG. 21 is a screenshot of UI of QM application 2100, in accordance with some embodiments of the present disclosure.

According to some embodiments of the present disclosure, UI 2100 shows a configuration of QM plan in QM application to distribute only recorded calls in which Agent's burnout score is in the range of 2 to 4, which may act as a data-point for the evaluator to perform evaluations for root cause factors into performance issues, lack of knowledge, inefficient processes or other aspects leading to agent burnout.

FIG. 22 is a screenshot of UI 2200 of assignment of coaching program to an agent for future improvement, in accordance with some embodiments of the present disclosure.

According to some embodiments of the present disclosure, UI 2200 may present the average burnout index of the team over a month upon a user-click on one of the icons of the teams on the left pane. Also, a root cause analysis in the form of pie chart may be presented. On the other hand, attrition rate against burnout score may be plotted for future strategies.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for calculating an agent-burnout index and identifying root-cause factors, said computerized-method comprising:

(i) for each agent in an agents-database:

a. calculating the agent-burnout index by operating a burnout-detection module, and storing the agent-burnout index in the agents-database, wherein said agent-burnout index indicates a level of stress and exhaustion of the agent;

b. identifying root-cause factors of the calculated agent-burnout index by operating root-cause analyzer module, and storing the identified root-cause factors in the agents-database; and (ii) automatically sending a push-notification to a user with details of agent-burnout index for each agent in the agents-database, wherein said push-notification is displayed via a User Interface (UI) associated to a Workforce Management (WFM) application that is running on a computerized-device of the user.

2. The computerized-method of claim 1, wherein the computerized-method further comprising: operating a burnout-transition monitor module to continuously check the agent-burnout index of each agent in the agents-database, and determining the corrective action for the identified root cause factors when the calculated agent-burnout index is above a preconfigured burnout-threshold by operating a remedy-recommender module.

3. The computerized-method of claim 1, wherein the burnout-detection module comprising:

(i) continuously monitoring interactions of the agent during a first preconfigured period to collect interaction related data and to randomly collect audio segments of the interaction as voice samples;

(ii) analyzing quantitative-performance-metrics in the collected interaction related data based on one or more performance-categories to yield Average Handling Time (AHT) and First Call Resolution (FCR) for each interaction;

(iii) analyzing the voice samples of the agent to yield one or more parameters and classifying the one or more parameters by operating Machine Learning (ML) algorithms, wherein said one or more parameters comprising at least one of: a. speech patterns; b. tone; and c. cadence, (iv) calculating quality-performance-metrics for each interaction based on the yielded one or more parameters; and (v) calculating the agent-burnout index based on formula I:

$$BS = \int_0^t (HV + EL + RT + LA + PP + IT + PE) \cdot e^{\frac{t-s}{T1}} \cdot e^{\frac{s}{T2}} \qquad (I)$$

whereby:

BS is a Burnout Score which is a calculation of the agent-burnout index,

HV is High Call Volume, which indicates interactions volume above a threshold during a specified period when the interaction has been conducted, EL is Emotional Labor, determined by sentiment analysis tools that automatically evaluate an emotional tone and stress levels in interactions of the agent, RT is Repetitive Tasks, evaluated by analyzing task logs to identify and count frequency of repetitive tasks performed by the agent, LA is Lack of Autonomy, which is a measure of control the agent has over work and decision-making processes, PP is Performance Pressure, measured by automatically comparing performance targets with performance metrics of the agent to identify deviations that indicate pressure, IA is Inadequate Training, evaluated by analyzing training completion rates and correlating them with performance data of the agent to identify gaps in training effectiveness, PE is Physical Environment, measures level of impact of workspace conditions on agents' comfort and performance, IB is Inadequate Breaks, monitored by tracking agents' break times and durations, automatically through time-keeping systems and identifying patterns of inadequate breaks, T1 is a total time that the agent was available, T2 is a total time that the agent is expected to be available, t is a duration period for a calculation of the burnout score, and s is an average of T1 and T2.

4. The computerized-method of claim 3, wherein said one or more performance-categories comprising for each interaction at least one of: (i) call-duration; (ii) resolution-time; (iii) First Call Resolution (FCR), (iv) Hold Time, (v) After-Call Work Time, (vi) Transfer Rate, (vii) Average Handling Time.

5. The computerized-method of claim 3, wherein said one or more quality-performance-metrics comprising at least one of: (i) Customer Satisfaction Score (CSAT); (ii) professionalism; (iii) communication skills; (iv) script adherence; (v) regulatory compliance; (vi) call resolution accuracy; and (vii) level of tiredness.

6. The computerized-method of claim 1, wherein the operating of the root-cause analyzer module comprising:

(i) retrieving burnout-parameters from the agents-database;

(ii) training a Machine Learning (ML) model on the retrieved burnout-parameters;

(iii) operating a feature importance analysis to identify level of relevance of each parameter in predicting the agent-burnout index;

(iv) marking a preconfigured number of factors from the one or more factors, having highest level of relevance as the root-cause factors; and (v) storing the root-cause factors in the agents-database.

7. The computerized-method of claim 6, wherein the burnout-parameters are categorized as features or agent-burnout index.

8. The computerized-method of claim 6, wherein the burnout-parameters are at least one of: (i) call volume above a threshold during a specified period; (ii) emotional labor; (iii) agent-burnout index; (iv) repetitive tasks; (v) lack of autonomy; (vi) performance pressure; (vii) inadequate training; (viii) physical environment; and (ix) inadequate breaks.

9. The computerized-method of claim 6, wherein the ML model is Random Forest Regressor model and wherein the level of relevance of each parameter is identified based on decrease in node impurity.

10. The computerized-method of claim 3, wherein the operating of the remedy-recommender module comprising:

(i) generating a template-text that includes the agent-burnout index, the identified root-cause factors, and a number of remedies in the corrective action;

(ii) constructing a prompt based on the template-text;

(iii) forwarding the prompt to a Generative Artificial Intelligence (GEN AI) model to receive the corrective action;

(iv) analyzing the received corrective action from the Gen AI by operating a Natural Language Processing (NLP) model to extract the remedies;

(v) retrieving current remedies associated to the agent from the agents-database;

(vi) comparing the extracted remedies with current remedies for the agent;

(vii) when there is a match between the extracted remedies and the current remedies repeating operations (ii) to (vi); and (viii) storing the received corrective action in the agents-database.

11. The computerized-method of claim 10, wherein said computerized-method further comprising configuring one or more applications to automatically operate the corrective action corresponding to each agent in the agents-database.

12. The computerized-method of claim 10, wherein the corrective action is automatically scheduling at least one of: (i) paid time-off via the WFM application; (ii) routing less interactions than a preconfigured volume-threshold during peak-hours via an Automatic Call Distribution (ACD) application; (iii) stress-relief activity; (iv) training session via the WFM application; and (v) break for a predetermined period of time in a schedule of the agent via the WFM application.

13. The computerized-method of claim 10, wherein said computerized-method further comprising continuously monitoring agent-burnout index during a second preconfigured period to: (i) determine a change in agent-burnout index and automatically operate burnout-category determinations and corresponding corrective action, when the determined change is above a preconfigured threshold; and (ii) detect repetitive burnout patterns.

14. The computerized-method of claim 13, wherein the operating of the remedy-recommender module further comprising determining the corrective action based on the detected repetitive burnout patterns.

15. The computerized-method of claim 10, wherein the predefined criteria comprising at least one of: (i) coherence; (ii) relevance; and (iii) informativeness.

* * * * *